United States Patent
Nikkanen et al.

(10) Patent No.: US 9,294,687 B2
(45) Date of Patent: Mar. 22, 2016

(54) ROBUST AUTOMATIC EXPOSURE CONTROL USING EMBEDDED DATA

(71) Applicants: Jarno Nikkanen, Kangasala (FI); Edwin Van Dalen, Eindhoven (NL)

(72) Inventors: Jarno Nikkanen, Kangasala (FI); Edwin Van Dalen, Eindhoven (NL)

(73) Assignee: INTEL CORPORATION, Santa Clara, CA (US)

( * ) Notice: Subject to any disclaimer, the term of this patent is extended or adjusted under 35 U.S.C. 154(b) by 33 days.

(21) Appl. No.: 14/099,298

(22) Filed: Dec. 6, 2013

(65) Prior Publication Data

US 2015/0163414 A1    Jun. 11, 2015

(51) Int. Cl.
| | |
|---|---|
| H04N 5/243 | (2006.01) |
| H04N 5/325 | (2006.01) |
| H04N 5/353 | (2011.01) |
| H04N 5/235 | (2006.01) |

(52) U.S. Cl.
CPC ............ H04N 5/243 (2013.01); H04N 5/2351 (2013.01); H04N 5/353 (2013.01); H04N 5/3532 (2013.01)

(58) Field of Classification Search
None
See application file for complete search history.

(56) References Cited

U.S. PATENT DOCUMENTS

| | | | | |
|---|---|---|---|---|
| 5,831,676 | A * | 11/1998 | Takahashi et al. | 348/362 |
| 6,667,765 | B1 | 12/2003 | Tanaka | |
| 7,565,077 | B2 | 7/2009 | Rai et al. | |
| 8,941,755 | B2 * | 1/2015 | Nikkanen | 348/223.1 |
| 2005/0264492 | A1 * | 12/2005 | Knapp | G09G 3/3233 345/76 |
| 2008/0068359 | A1 * | 3/2008 | Yoshida | G09G 3/3406 345/204 |
| 2009/0244329 | A1 | 10/2009 | Kuniba | |
| 2010/0026843 | A1 * | 2/2010 | Tezuka et al. | 348/231.2 |
| 2010/0073494 | A1 * | 3/2010 | Hirose et al. | 348/208.4 |
| 2012/0162467 | A1 * | 6/2012 | Nakamura | 348/229.1 |
| 2013/0193309 | A1 * | 8/2013 | Nakata et al. | 250/208.1 |
| 2014/0016022 | A1 * | 1/2014 | Yoshioka et al. | 348/362 |

OTHER PUBLICATIONS

Kuno et al., "A New Automatic Exposure System for Digital Still Cameras," IEEE Transactions on Consumer Electronics, vol. 44, No. 1, Feb. 1998, pp. 192-199.

Lee et al., "An Advanced Video Camera System With Robust AF, AE, and AWB Control," IEEE Transactions on Consumer Electronics, vol. 47, No. 3, Aug. 2001, pp. 694-699.

Liang et al., "An Auto-Exposure Algorithm for Detecting High Contrast Lighting Conditions," 2007 International Conference on ASIC, 2007, pp. 725-728.

Yang, et al., "A New Automatic Exposure Algorithm for Video Cameras Using Luminance Histogram," Front. Optoelectron. China 2008, pp. 285-291.

Ilstrup, et al., "One-Shot Optimal Exposure Control," ECCV 2010, Part 1, LNCS 6311, pp. 200-213.

Liu et al., "Study of Automatic Exposure Algorithm Based on HD IP Camera," Proceedings of AIAI 2010, 4 pages.

Vuong et al., "A New Robust Combined Method for Auto Exposure and Auto White-Balance," Advances in Machine Learning and Data Analysis, Lecture Notes in Electrical Engineering 48, Chapter 11, 2010, pp. 165-178.

Shimizu et al., "A New Algorithm for Exposure Control Based on Fuzzy Logic for Video Cameras," IEEE Transactions on Consumer Electronics, vol. 38, No. 3, Aug. 1992, pp. 617-623.

Extended European Search Report for EP 14191778.1, mailed May 28, 2015, 6 pages.

* cited by examiner

*Primary Examiner* — Albert Cutler
(74) *Attorney, Agent, or Firm* — Lynch Law Patent Group, P.C.

(57) ABSTRACT

A method, system, and article provide robust automatic exposure control using embedded data.

18 Claims, 11 Drawing Sheets

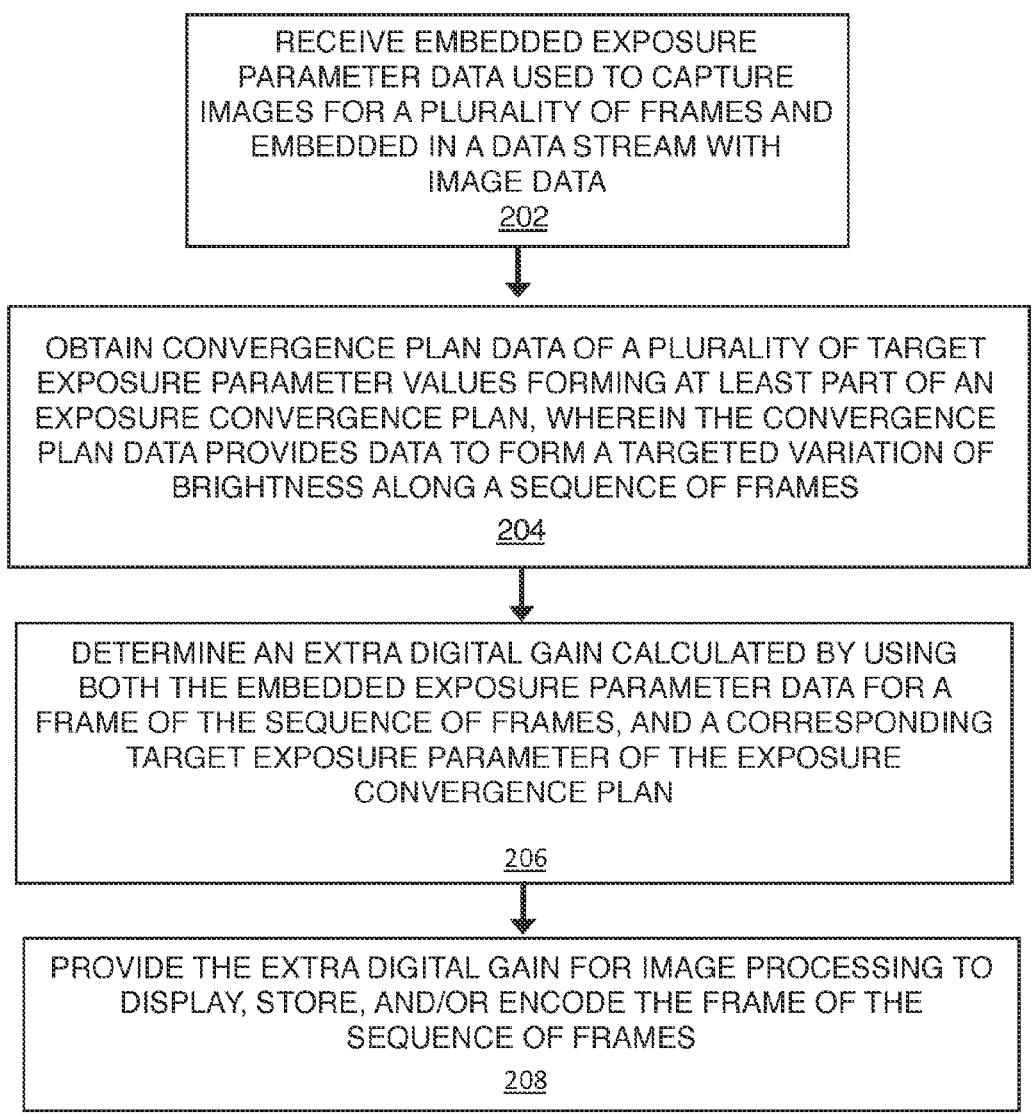

ROBUST AUTOMATIC EXPOSURE CONTROL USING EMBEDDED DATA

BACKGROUND

Digital image processing devices, such as digital cameras, use automatic features to increase the quality of an image, such as the preview screen on the digital camera as well as the recorded image and recorded video. This includes the 3A features which refers to automatic white balancing (AWB), automatic focus (AF), and automatic exposure control (AEC). Exposure is the amount of incident light captured by a sensor, and which may be adjusted by adjusting the camera's aperture size and shutter speed as well as ND filter control and flash power, some of which may be electronic systems rather than mechanical devices. ND filter refers to a Neutral Density filter that is sometimes used with mechanical shutters when the mechanical shutter is not fast enough for the brightest illumination conditions. The AEC also may calculate analog gain, and digital gain when present, that amplify the raw image signal that results from the used exposure time. Together the exposure parameters determine a total exposure time referred to herein as the total exposure. The gains impact a signal level, or brightness, of the RAW image that comes out from the camera sensor. If the total exposure is too short, images will appear darker than the actual scene, which is called under-exposure. An image signal can even be so under-exposed as to become lost if the signal is less than a noise floor, or is quantized to zero. On the other hand, if the total exposure is too long, the output images will appear brighter than the actual scene, which is called over-exposure. An image signal may even be lost due to over-exposure when the signal becomes saturated, such as when the signal value exceeds a full well capacity of the pixels, or when the analog or digital gains cause the signal value to exceed a maximum digital value. The signal can even be lost if it becomes saturated. Both cases may result in a loss of detail resulting in a poor quality image.

Automatic exposure control is used to compute the correct exposure necessary to obtain an acceptable display image from the digital camera, such as for the viewfinder or preview screen on the camera, recorded video, and/or still images. Such computations also may be used to adjust the exposure settings for capturing subsequent images with the camera. Thus, the timing of the transmission of parameters between a processor performing the AEC calculations and a camera controller are very important. If delay in transmission occurs, a flicker or jump in brightness in a digital camera screen may be visible to a user via viewfinder screen or recorded video, and an image may be captured or recorded with the wrong exposure. Thus, it is desirable to have an automatic exposure control that maintains high quality images and video.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 is a flow chart illustrating an example exposure control processing method;

DETAILED DESCRIPTION

Figure 1A:
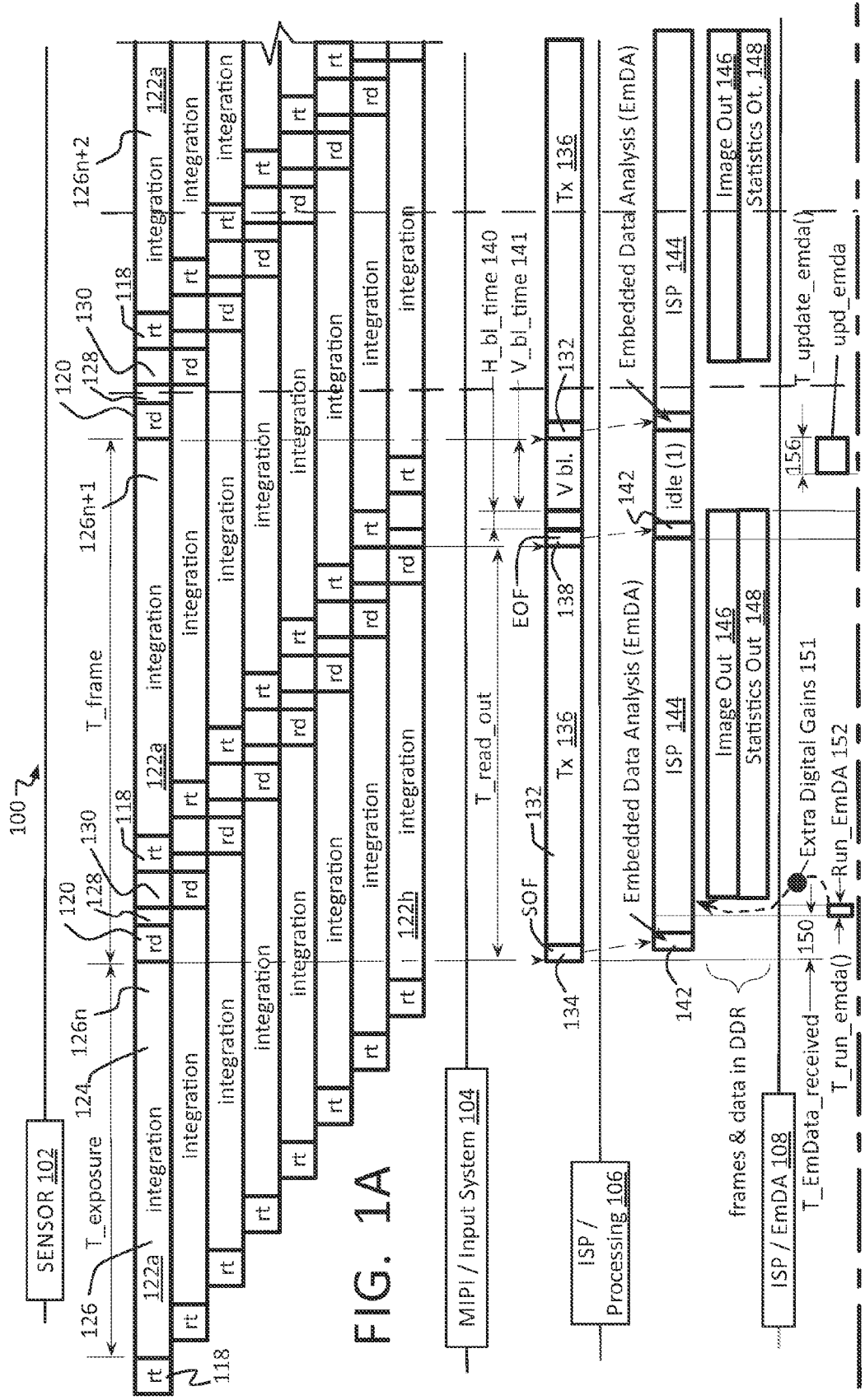
FIGS. 1A-1B is cooperatively a timing chart for the operation of automatic control features of a digital imaging device.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods to provide robust automatic exposure control using embedded data is described below.

As mentioned above, many digital cameras and devices with such cameras provide automatic control features such as the 3A features including automatic focus (AF), automatic exposure control (AEC), and automatic white balance (AWB). Relevant herein, automatic exposure control (AEC) uses algorithms to adjust the exposure parameters to capture images and to provide adjustments for the brightness parameters for the display of an image, whether on a live preview screen of the digital camera, or other recorded display, and storage or encoding of the image or video for later viewing. When the parameters are being updated at a sufficient speed, the brightness in the live preview screen or in a recorded video will appear to change smoothly from frame to frame without noticeable flickers or abrupt changes in brightness such that a smooth convergence of brightness (or a noticeable, stable brightness) is attained. This provides the image a carefully controlled, high quality appearance. In order to achieve such smooth and sufficiently fast updating of the exposure parameters, the updated parameters are provided to a camera sensor for example, at a rate of at least about 30 Hz.

A delay may occur when the processor performing the AEC calculations receives the latest exposure parameters from a camera sensor late. In addition, a short time window may be set in which the transmission of new exposure parameters is requested, started, and finished. If the window closes before the transmission is completed, then the new settings are not used in the sensor's next image or frame, increasing the risk of abrupt changes in brightness for that next frame. Otherwise, a delay may occur in the relatively slow i2c protocol used to transmit data back to the camera sensor. These delays may occur due to bandwidth at the control processing unit (CPU), whether at the camera sensor control, image signal processor (ISP), or other shared processor, such that the camera control module or processor may be busy with other processing tasks. Otherwise, the delay may simply occur due to bandwidth at the data transmission pathways between any of the system components.

One way to attempt to resolve these issues is to provide a dedicated processor to run 3A algorithms to ensure that no other processing will delay the AEC processing. Otherwise, dedicated i2c controllers may be added to ensure that no other traffic delays 3A traffic. These solutions, however, may require relatively expensive hardware.

Another possible solution is to strictly enforce the processing time limit allocated for an AEC algorithm. This solution, however, may still be insufficient, and may require the additional hardware anyway. Such limitations are very difficult to implement, and the resulting target brightness that is set by AEC might not be optimal in all image capture situations because not all required analysis can be guaranteed to occur in the given strict processing time limits for all frames.

Instead, the solution that is proposed herein makes the Automatic Exposure Control (AEC) transmissions and calculations less critical with respect to timing. The present image processing system embeds used, actual exposure parameters in the data stream from the camera sensor. The ISP or other processor then uses an Embedded Data Analyzer (EmDA) to check the embedded data against a target automatic exposure convergence plan of target total exposure times, or more accurately target total exposures, that would create a smooth change in brightness along a sequence of frames corresponding to the frames of the actual embedded data. The target total exposure time is referred to as the target total exposure since it is formed by factors other than just time as described herein. The EmDA provides an adjustment value, in the form of an extra digital gain in one example, before processing of the raw frame for the camera preview screen or final image display, storage, and/or encoding. The extra digital gain is used to adjust the ISP settings to factor in the target total exposures. With this system, even though embedded exposure parameter values for a sequence of consecutive frames may be less than optimal due to a delay in transmission of updated exposure parameters to the camera sensor, the use of the extra digital gain overcomes this problem to produce smooth changes in brightness for further image processing, and despite the delay.

Figure 1B:
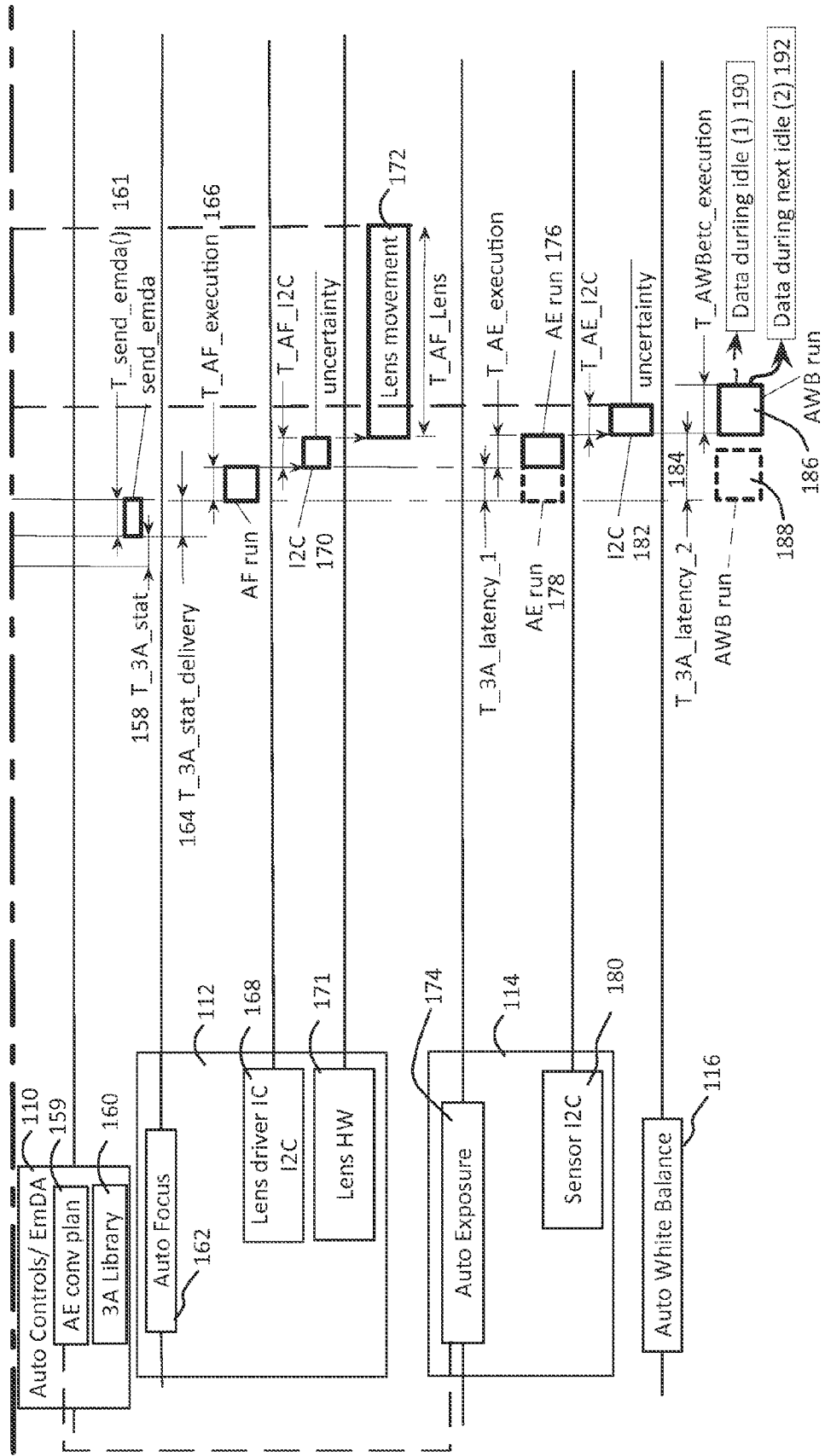

FIGS. 1A-1B cooperatively show an image processing system 100 on a time-line chart where time runs from left to right, and includes the operation of at least a camera or image sensor 102, a camera data streaming protocol input system 104, such as a mobile industry processor interface (MIPI) or other input protocol, one or more image signal processors (ISP) or other processor 106. The same or one or more other processors may also operate an embedded data analyzer (EmDA) 108. An automatic controls logic component or unit 110 provides 3A statistics for use by the 3A automatic adjustment controls. The system 100, or in one form the automatic controls unit 110, may include operation of, or be communicatively coupled to, an automatic focus (AF) component 112, an automatic exposure control (AEC) component 114, and an automatic white balancing (AWB) component 116, a combination of any of these, and the like.

Referring to FIG. 2, an example process 200 for automatic exposure control by an imaging system described herein is arranged in accordance with at least some implementations of the present disclosure. In the illustrated implementation, process 200 may include one or more operations, functions or actions as illustrated by one or more of operations 202, 204, and/or 206. By way of non-limiting example, process 200 will be described herein with reference to example image processing system of FIGS. 1A-1B and 8 where relevant.

By one implementation of an image processing system, process 200 may include "RECEIVE EXPOSURE PARAMETER DATA USED TO CAPTURE IMAGE DATA FOR A PLURALITY OF FRAMES AND EMBEDDED IN A DATA STREAM OF IMAGE DATA" 202. In one example, a camera or image sensor, such as camera sensor 102, may provide exposure data that is placed in a bitstream 132 of an input system, such as input system 104, and that is provided to one or more processors such as image signal processor (ISP) 106.

Process 200 may also include "OBTAIN CONVERGENCE PLAN DATA OF A PLURALITY OF TARGET EXPOSURE PARAMETER VALUES FORMING AT LEAST PART OF AN EXPOSURE CONVERGENCE PLAN . . ." 204, and particularly where the exposure convergence plan data provides data to form a targeted variation of brightness along a sequence of frames. The exposure convergence plan may be obtained from a database, buffer, or other memory, such as an Intel 3A library 160. The exposure convergence plan (or brightness or luminance convergence plan) is a list of total exposures. The list may additionally or alternatively include the parameters to calculate the total exposures such as actual exposure time (et), analog gain (ag), and digital gain (dg)). The total exposures are provided to gradually and smoothly change the brightness for a frame sequence from a start frame to an end frame in order to avoid an abrupt change in brightness. By one form, the AEC component 114 receives data indicating a change in brightness and then forms intermediate exposure times, such as by interpolation in one example, and for a desired number of intermediate frames to obtain a gradual change in brightness. This AE convergence plan is then provided to, or is accessible by, the EmDA for example. The AE convergence plan includes corresponding frame identification or frame number for each exposure time, which may be in the form of an index. This process is explained in greater detail below with the explanation of FIG. 7.

Process 200 may continue with the operation "DETERMINE AN EXTRA DIGITAL GAIN CALCULATED BY USING BOTH THE EMBEDDED EXPOSURE PARAMETER DATA FOR A FRAME OF THE SEQUENCE OF FRAMES, AND A CORRESPONDING TARGET EXPOSURE PARAMETER OF THE EXPOSURE CONVERGENCE PLAN" 206. In other words, this extra digital gain is like an error correction so that the image is effectively displayed or otherwise processed using the value of the target total exposure rather than an actual total exposure that may result in brightness flicker. The extra digital gain may be referred to as the error, adjustment, and/or correction, and may be a value representing the ratio between a target and actual frame exposure parameter. While the extra digital gain may be calculated by using embedded exposure time (before gains are applied), digital gain, or analog gain, by one form, the extra digital gain is calculated by using an actual total exposure for a frame and calculated from the embedded data, and a corresponding target total exposure as the target exposure parameter. A subsequent operation in process 200 is to "PROVIDE THE EXTRA DIGITAL GAIN FOR IMAGE PROCESSING TO DISPLAY, STORE, AND/OR ENCODE THE FRAME OF THE SEQUENCE OF FRAMES" 208.

Now in more detail while referring again to FIGS. 1A-1B, the illustrated image sensor 102 may be controlled to operate a rolling shutter or electronic focal plane shutter process where the pixels are reset for photocharge in a line-sequential (line-by-line) fashion, and read out in a line-sequential fashion for an entire frame. In this type of system, the exposure times from row to row may overlap and need not be performed at the same time. The time between the row reset (rt) 118 and the row read-out (rd) time 120 is the integration time or exposure time (T_exposure) 122, which is the time used for accumulating photocharge in a one or more rows of pixels on a frame (or picture or image) or even just part of a row. The length of the integration 122 may vary depending on how many rows or pixels are covered by the integration. The row read-out measures the amount of photocharge in the row and since the last reset which initiated the integration time.

The resets 118 are performed one at a time down the frame, row by row, so that here, each diagonal column 124 of integration rows (also referred to as the exposure time) 122 corresponds to a frame 126. Frame 126 is shown with integration rows 122a to 122h for a total of eight integration rows, but as understood, the frame will or may have many more integration rows than eight, but need not be shown here. Since the resets 118 are offset in time, when the exposure time 122 is the same or similar throughout a single frame, a diagonal column is formed with uniform steps. Regardless of the length of the integration 122 and position of the resets 118, the read outs 120 are timed so that the read outs will be performed one at a time for each integration row down the frame 126, forming a diagonal line of read outs 120 with uniform, or close to uniform, steps as shown. Here, the exposure times or integrations for three frames 126(n), 126(n+1), and 126(n+2) are shown. The time period (T_frame) for capturing the brightness for a frame is measured from readout to readout. It will be understood, however, that the lengths of the integrations 122 may vary for a frame depending on the number or portion of lines covered by the integration. In this case, the location of the resets may not form a perfect diagonal line and may be much more staggered while the timing of the readouts are maintained so that the readouts may be performed in order one at a time as shown. Otherwise, the length of the exposure time may be limited by the length of the frame such that exposure time cannot be longer than the frame length. This is marked by the position of the vertical (frame) blanking for example which would be placed at the bottom of the diagonal column 126 (not shown on the RAW data). The frame length, however, can be increased by making the frame blanking (vertical blanking) longer as discussed below.

The readout 120 may be separated from the next row reset 118 in the same row by a horizontal or line blanking space 128 and an adjustment or reserved time block 130. Here, instead of a horizontal blanking space being placed at the end of every pixel row of a frame, a horizontal blanking space may be provided at the end of every integration row as shown (which may or may not align with an end of every pixel row of a frame). The actually sensed area in total line length (horizontal) as well as number of lines in a frame (vertical) may be larger than the visible space on a device or to be analyzed. Thus, horizontal or line blanking is a non-transmission period covering the time of a scan of pixel positions along a line and that is not visible. The same is true for vertical blanking introduced below. The blanking spaces are used for synchronization. Horizontal or line blanking may be used to provide a component (such as an ISP) sufficient time to handle incoming data. For example, ISP processing can fail (such as with an input buffer overrun) if the line blanking is too short compared to the pixel clock, or the rate at which a sensor is sending data. Vertical or frame blanking is used to control the frame rate where the longer the vertical blanking, the slower the frame rate, the longer the maximum possible exposure time, and the more time to perform calculations before readout of the next frame starts. The reserved time block 130 is used to limit or prevent any overlap of readout periods.

The digital camera sensors can be configured to output certain embedded data alongside the actual RAW image data. For example, Standard Mobile imaging Architecture (SMIA) 1.0 group and Mobile Industry Processor Interface (MIPI) standards define examples of such embedded data. This embedded data may have a description of the exposure parameters (exposure time, analog gain, digital gain) that are in effect in the RAW frame with which the embedded data is associated. RAW image data herein refers to image data that is not yet processed and ready for printing or editing by a bitmap graphics editor for display, and may be in the input data or bit stream 132 (here represented by a bar actually showing the time periods for building the bitstream). The bit stream 132 is streamed or transmitted from a camera or image module or sensor 102 to a processor 106.

By one approach, the input data or bit stream 132 may have a start of field (SOF) 134, a main transmission portion Tx 136 of the RAW image data for multiple overlapping rows in the integration column 126 that are associated with a single frame 126n, for example. In the illustrated form, the data for the readouts 120 of all eight of the integration rows 122a-122h (and more rows when provided) are placed in the main transmission portion Tx 136. The main transmission portions 136 end at an end of field (EOF) 138 followed by a horizontal blanking time 140, and then a longer vertical blanking period 141 is provided when the end of one frame is reached and the data for the next frame begins. Horizontal blanking time in the bit stream 132 increases the time that it takes to read out the full frame to allow the receiving side (such as the ISP) to empty its input buffers before the next line is sent, for example. By another alternative, the horizontal blanking is not used where the horizontal blanking is zero or non-zero, and virtual pixels could be transferred during line blanking or not transferred.

The actual exposure parameter data may be embedded in the start of field 134 portions and/or end of field portions 138 of the input bit stream 132. The embedded data may be placed in the end of field 138 when the ISP processing uses data from memory rather than as streamed in. The embedded data includes the exposure time actually used by the image sensor 102 to capture image data and previously provided to the sensor from the automatic exposure control (AEC) 114. The embedded data also includes the digital gain (dg) and analog gain (ag) used to calculate total exposure for the frame accompanying the data and that is applied at the readout. The analog gain may be applied by the sensor before it performs analog-to-digital conversion. The benefit from analog gain compared to digital gain is that it reduces the quantization noise that is caused by an A/D converter. The analog gain may provide an increase in total exposure when the exposure time has other limitations, such as a maximum value in order to avoid motion blur due to shaking of the camera, but where increased exposure is needed to avoid under-exposure. The analog gain better ensures that the data covers more of the full range of the A/D converter, thereby avoiding lower end concentrations just above a higher quantization noise pedestal, for example.

The gains are also provided to the sensor by the AEC 114, and as explained in detail below. In one form, as mentioned above, MIPI protocol may be used for this transfer. The embedded data may not have exposure time in terms of seconds, or gains as multipliers. Instead, exposure time may be controlled in the camera sensor in terms of line periods where each line is the number of lines covered by the exposure time, and possibly an additional fractional part of one line in terms of pixel periods which is the portion of a line covered by an exposure time. This is the same for analog gain; it is controlled in terms of gain code. These parameters are stored in the embedded data with the same units that the sensor uses. Thus, the pixel clock frequency may be used to convert from sensor units to generic units for calculating the extra digital gain explained below where one line period of a frame may be equal to a certain number of pixel periods (line_length_in_pixel_periods). The line period, and pixel period if supported by the sensor, are sent from the sensor and in the bitstream 132 with the image data. The exposure time may be controlled by controlling the amount of line periods plus (optionally) any additional pixel periods.

Figure 3:
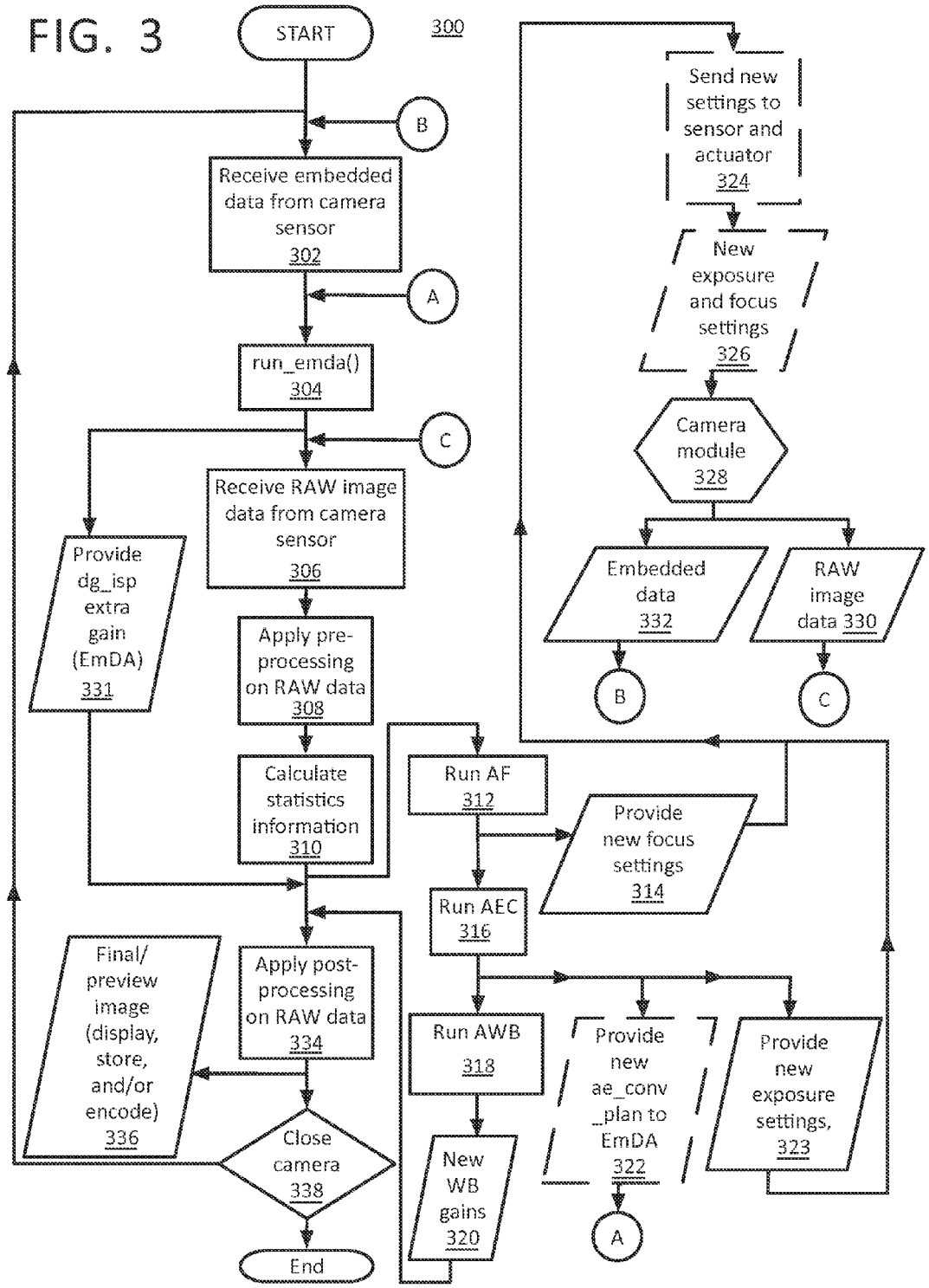
FIG. 3 is a flow chart illustrating an image processing method using automatic control features.

Referring to FIG. 3, much of the remaining description of the operation of system 100 may be described in conjunction with a process 300 for automatic camera control for increased image quality. Process 300 described herein is arranged in accordance with at least some implementations of the present disclosure. In the illustrated implementation, process 300 may include one or more operations, functions, or actions as illustrated by one or more of operations 302 to 338 numbered evenly. By way of non-limiting example, process 300 will be described herein with reference to example image processing system of FIGS. 1A-1B and 8.

Process 300 may include "receive embedded data from camera sensor" 302, and in one example, the ISP 106 may obtain, or may have access to, the embedded data from the start of field 134 or end of field 138 portions of the received bitstream 132. The ISP 106 may have a time period 142 for reading and performing analysis of the embedded data initiated after receiving the start of field and end of field data from the bitstream 132. The ISP 106 may then receive and analyze the image data at a time period (ISP analysis) 144 with idle periods 146 between the receipt of adjacent frames, during the horizontal and vertical blanking period 140 and 141.

For general image processing, once the ISP receives 306 some of the raw image data, it may apply 308 pre-processing on the RAW data. This may include noise reduction, pixel linearization, and shading compensation. It also may include resolution reduction, Bayer demosaic, and/or vignette elimination. Once pre-processed, general image statistics information may be calculated 310. This may include luminance/chrominance values and averages, luminance/chrominance high frequency and texture content, motion content from frame to frame, any other color content values, picture statistical data regarding deblocking control (for example, information controlling deblocking/non-deblocking), RGBS grid, filter response grid, and RGB histograms to name a few examples. This information may be provided on a macroblock or coding unit (CU) basis (for example, per 16×16, or 8×8, or other size block of pixels), or may be provided per pixel, or other unit basis as desired depending on compatibility parameters for certain standard coding schemes such as H.264/Advanced Video Coding (AVC) or High Efficiency Video Coding (HEVC), JPEG or other image processing and encoding standards. These standards may be used at the end of post-processing 334 when YUV data is available and the ISP has reconstructed the images. The image data and calculated statistics may be stored in a double data rate (DDR) or other sufficient memory, and may then be provided for further analysis during a time period image out 146 and statistics out 148.

The ISP, and in turn the embedded data analyzer EmDA 108, may receive the embedded data during a time period T_EmData_received 150 which may begin once the embedded data is received from the start of field 134, or one or more of the other SOF or EOF fields 134 or 138. Once received, the embedded data analyzer may be run 304 during a time period T_run_emda( ) 152 to provide an extra digital gain (dg_isp) 151 according to an exposure convergence plan described herein and below with processes 600 and 700, and is provided 331 back to the ISP to be used for further image processing. The extra digital gain, for example, may be included to adjust white balancing gains of the ISP. By one approach, where white balancing gains are gainR, gainG and gainB, then the new_gainR=gainR*dg_isp, new_gainG=gainG*dg_isp, new_gainB=gainB*dg_isp. Alternatively, the extra digital gain could be included in a gamma table where the gamma table is gammaLUT[ ] for each color component. Then, for all i=[0, max_value], new_gammaLUT[i]=gammaLUT[i]*dg_isp. By yet another alternative, any other ISP operation may use the extra digital gain to factor in a target total exposure as described below, and as long as RGB values are added in linear increments.

Updating the extra digital gain into ISP registers must happen before ISP processing starts for every frame (unless the corresponding ISP register value(s) are already correct). Run_emda 152 is a relatively tiny amount of calculations, so that updates can be done even if 3A execution has been delayed. By one approach, the run_emda code is placed in the system so that this is guaranteed (and in one case so that run_emda is not necessarily running on the same processor as the 3A analysis algorithms). When new updates of ISP parameters is not available from 3A, then previously set ISP parameters are in effect.

Thereafter, the process 300 may continue to apply 334 post-processing and for final or preview display of the frame or image, storage for later use for example, and/or encoding, or any combination of these 336.

The automatic controls unit 110 may be considered to include the AEC component 114, or at least the AE convergence plan component 159 with the portions or algorithms of the AEC component 114 that forms an initial AEC or AE exposure convergence plan (ae_conv_plan), also referred to herein as an AE convergence plan or automatic exposure convergence plan, that includes a list or index of target future total exposures and the corresponding frame identification for each total for a sequence of frames including future frames not necessarily captured yet. This initial AE exposure convergence plan (ae_conv_plan) may be stored in a 3A statistics library 160 accessible to the automatic controls unit 110 and AEC 114. Once the AE exposure convergence plan is made available, such as after formation of the AE exposure convergence plan during period 158 of 3A statistics for example, the AE exposure convergence plan is provided 322 to the embedded data analyzer 108 or the embedded data analyzer 108 may retrieve the new AE exposure convergence plan during a time period T_send_emda( ) 161 to initiate the period 156 to update an emda exposure convergence plan. The emda exposure convergence plan (emda_ae_conv_plan) also may be referred to herein as the emda plan, emda convergence plan, emda ae convergence plan, and so forth. The formation of the AE convergence plan is explained below with processes 600 and 700.

Also, once the image and general statistics are obtained or calculated (146, 148), the automatic controls unit 110 uses the image data and general image statistics to form further 3A statistics at the time period T_3A_stat 158 for use by the automatic controls to make adjustments to the focus, exposure time, and white balance. Once the 3A statistics are available, 3A control and adjustment also may be performed, which may be performed one after another, or in one case where each control feature may have one or more dedicated processors, they may be performed in parallel. In the former case, the AF control 112 receives 3A statistics during a time period (T_3A_stat_delivery) 164. Once the 3A statistics are received, the AF logic unit or component 162 runs 312 and calculates focus adjustments during a period T_AF_execution 166. In one form, a lens driver 168 with i2c protocol then forms the commands for new focus settings 314 during a time period T_AF_I2C 170 after the AF execution period 166, and then send 324 the new AF settings to the camera module or sensor 326 so that lens hardware 171 on the camera may then move the lens during a period T_AF_Lens 172. The lens hardware may or may not be considered a part of the AF control 112. The camera module 328 may use the new settings to capture further images and provide new embedded data 332 and RAW image data 330 to restart the cycle as shown in FIG. 3. Also, the AF control 112 cannot use the statistics from the frames whose integration time is overlapping with the time T_AF_lens 172 for the lens movement. For that frame, here 126*n*+1, the commands are too late. Otherwise, the embedded data system herein may be used with fixed focus camera modules that do not have AF.

When the processor(s) are being shared among the 3A controllers, a first latency period (T_3A_latency_1) may delay the running 316 of the automatic exposure control 114 until the AF control 112 finishes the AF adjustment calculations 166. The AE component 174 may run 316 the exposure adjustment calculations during a time period (T_AE_execution) 176 to form new or updated exposure settings for the camera sensor. Alternatively, in a system with dedicated components, the auto exposure run 178 may occur while the AF control 112 is executing the AF adjustments 166. A sensor I2C component 180 may then provide 323 and send 324 the new exposure settings to the sensor and during a time period T_AE_I2C 182.

Note that at both the I2C transmission for the AE and AF commands, the word uncertainty is stated to indicate potential delay may occur at this point due to the time period 170 and/or 182 taking longer than indicated as discussed herein. It should be noted that the time for providing extra digital gains 150, 152, 151, to the ISP for processing and the updating of the EmDA convergence plan 156 does not directly depend on the timing of the AEC, AF, and AWB runs 166, 176, 186 or I2C transmissions 170, 182. Also, if some other parts of the system are competing for the same I2C or CPU resources, this may cause a variation in AE run time (T_AE_execution) as well as the AE I2C execution time (T_AE_I2C) or to any other part that needs those resources. This becomes even more important because it is beneficial to provide the AEC run or analysis with a flexible time envelope for every frame so that more thorough analysis can be performed for every frame or at least certain frames that require more in-depth analysis. The EmDA increases this benefit as it makes the system less timing critical.

Otherwise, the process 300 may continue with running 318 the AWB control 116 after a second latency period (T_3A_latency_2) 184 from the receipt of the 3A statistics 164. In this case, the processing may not begin until after the auto exposure execution period 176 is complete. Then, the AWB control performs adjustment calculations that provide new white balance (WB) gains 320 during a time period (T_AWBetc_execution) 186 after the second latency. Alternatively, if a dedicated processor is provided, the AWB run may occur during a period 188 while the AF and AE controls are performing their adjustment calculations.

ISP parameters for processing the images (to display, store, and/or encode for example) may be updated with data 190 or 192 including 3A adjustments or settings during a window such as an idle period (such as idle (1) on FIG. 1A) for a frame that has not yet been processed during a Tx time 136 by the ISP. As shown on FIGS. 1A-1B, the 3A processing has been delayed and is too late to be processed during idle(1) so that frames processed during the ISP processing period 136 just after idle(1) will not receive their appropriate adjustments. Alternatively, if the 3A processing is for the next idle(2) (not shown), the updated data 192 may be received to update a next ISP Tx 136 period since the idle(2) has not occurred yet.

The WB gains then may be used for processing of the image data, which may then proceed to post-processing 334 of the image data. Post-processing may include CFA (Color Filter Array) interpolation, color space conversion, (such as raw RGB to sRGB where not performed already, for example), gamma correction, RGB to YUV conversion, image sharpening, and so on. The post processing may be performed by a processor such as the ISP 106 or other processor mentioned herein, for performing these processes by software and/or the ISP's hardware pipelines.

Next, the processed image may be displayed 336 whether as a view-finder or preview on a digital camera or phone screen, or a final display on another device, or may be stored for later viewing, and may be video or a still image. Alternatively, or additionally, the image data may be provided to an encoder for compression and transmission to another display or storage device. Upon the stopping of recording or image capture, the camera may be closed 338, or otherwise the system may continue with capture of new images.

Figure 4:
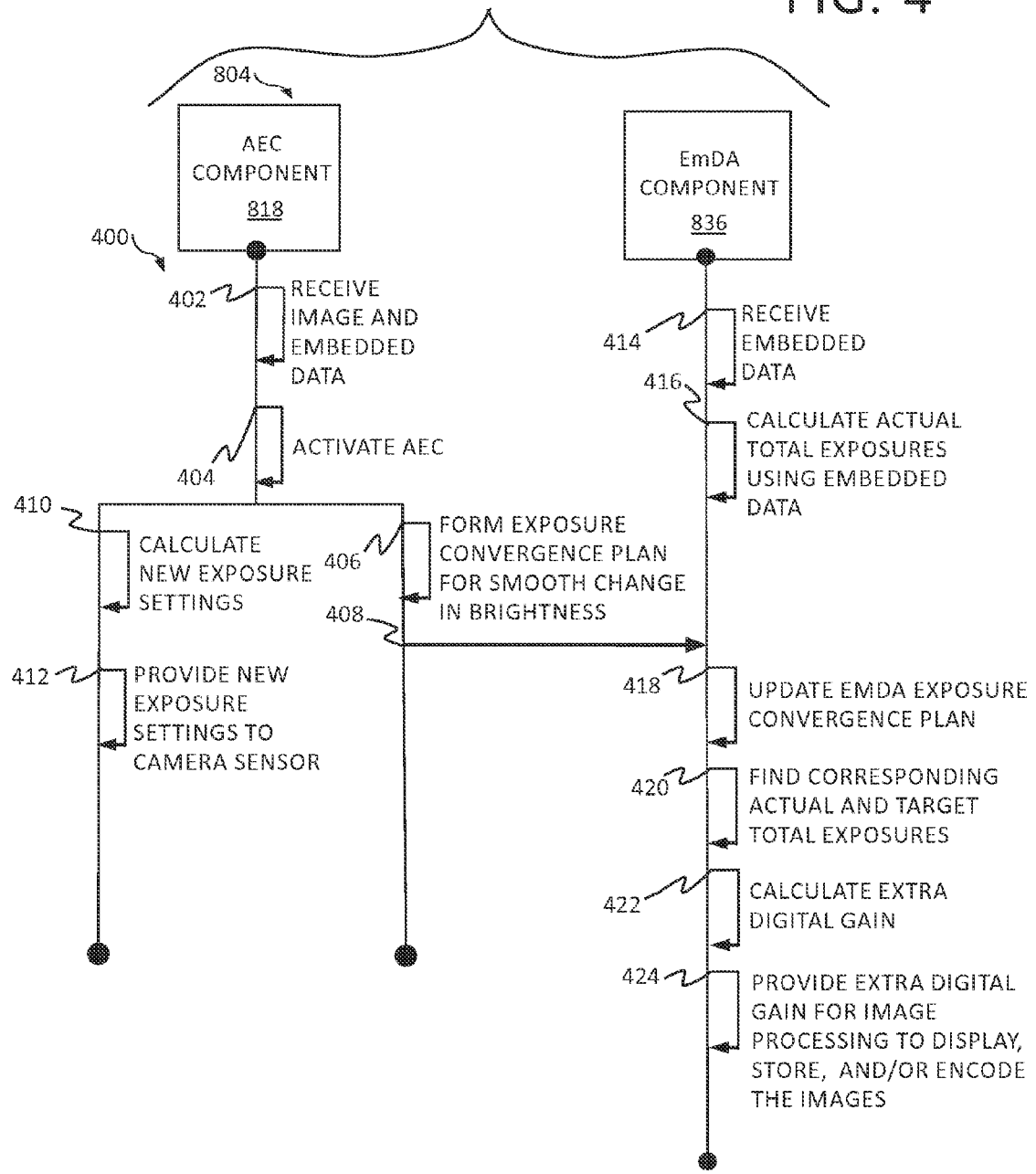
FIG. 4 is a diagram of an example image processing system in operation.

Referring to FIG. 4, process 400 illustrates the basic operation of a sample image processing system 800 for automatic exposure control using embedded data in accordance with at least some implementations of the present disclosure. In more detail, in the illustrated form, process 400 may include one or more operations, functions or actions as illustrated by one or more of actions 402 to 424 numbered evenly. By way of non-limiting example, process 400 will be described herein with reference to FIG. 8. Specifically, system 800 includes an AEC component 818 and an embedded data analyzer 834. The operation of the system may proceed as follows.

The AEC component 818 may "receive image and embedded data" 402, and "activate AEC" 404. AEC may be activated, via a request from the system by one example, whenever the viewfinder or preview on a camera is activated, or otherwise when a video record or image capture process is initiated, and may continue operating until the process is stopped. In the case of a preview screen, this may not be until the camera is turned off, or turned to a different function on a multi-function smart phone for example.

The AEC may then "form exposure convergence plan for smooth change in brightness" 406. By one approach, once activated, the AEC will form a new convergence plan (ae_conv_plan) every time it is activated to limit the chances of the EmDA running out of values for a convergence plan. By one example, a new convergence plan is provided for every frame or at least in small frame intervals (such as every other frame or every third frame, and so forth) also to attempt to ensure the EmDA always has a convergence plan accessible for a frame to be analyzed and does not run out of convergence plan values. While providing a convergence plan for every frame or close frames causes overlapping convergence plans, the EmDA will use a frame index (with frame numbers for example) for updating its EmDA convergence plan (emda_conv_plan) that merges the plans, or in one example, updates the old plan with the new plan.

By another alternative, the system might be set to determine if a new convergence plan is needed and to determine whether any abrupt changes in brightness occurred in the actually used exposure parameters by, in a few examples, detecting if a scene change occurred, or by comparing the total exposures used in adjacent frames. Otherwise, the process 400 may simply continuously provide, or plan ahead to provide, a new convergence plan whenever the current, effective convergence plan ends. When such a change in brightness occurs or when a new convergence plan is desired, the AEC component 818 may form a new exposure convergence plan or update an old plan. These alternative plans, however, require great control of timing to attempt to ensure that the EmDA does not run out of convergence plan values.

As mentioned herein the convergence plan (ae_conv_plan) provides the same or similar change in brightness over a greater number of frames than just two, such as three to five in one example, but may be more. The process for forming the AE exposure convergence plan is described below with the process of FIG. 7. By one approach, the exposure convergence plan includes target total exposures and corresponding frame numbers. Thereafter, the new convergence plan is provided 408 to the embedded data analyzer (EmDA) 834. The AEC component 818 may separately use the image data to "calculate new exposure settings" 410 for each frame, and may include exposure times, digital gains, and analog gains, and "provide the new settings to a camera sensor" 412. In this way, the timing of the use of the ae exposure convergence plan may not be substantially affected by the timing of the transmission of the new exposure settings to the sensor.

The EmDA 818 also may "receive embedded data" 414 such as the actual exposure time, digital gain, and analog gain used for a frame, and via the image data bit stream from a sensor. The process may then continue with "calculate actual total exposures using the embedded data" 416. When a new AE convergence plan is received, or obtained from, the AEC component 834, the EmDA 818 may then "update the EmDA exposure convergence plan" 418 with the data, which in most cases may be the target total exposures and corresponding identification of the frame for each total exposure. Once received or at least accessible, the EmDA 818 may "find corresponding actual and target total exposures" 420 that correspond to the same frame. Then the process 400 may perform "calculate extra digital gain" 422 such as to provide a comparison of corresponding target and actual exposure parameters, and in one example, target and actual total exposures. This process is explained in greater detail below with process 600. The process 400 may then continue with "provide the extra digital gain for image processing to display, store, and/or encode the images" 424.

Figure 5:
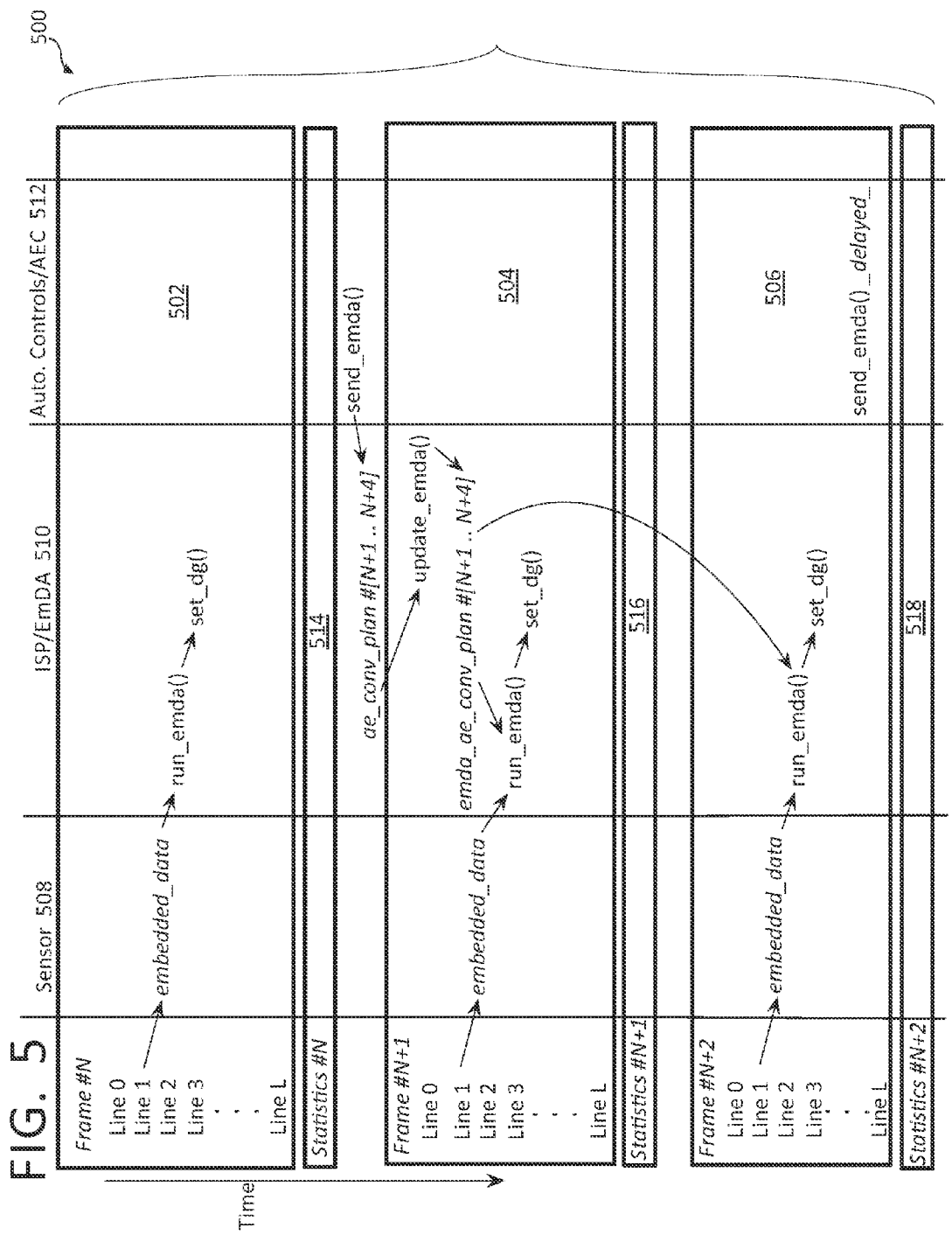
FIG. 5 is a frame-based timing diagram showing the operation of an example image processing method.

Referring to FIG. 5, a frame time chart shows operation of the process 500 similar to other processes disclosed herein, and shows some of time periods from FIGS. 1A and 1B in a different way. The time for the ISP analysis of three frames are shown N (502), N+1 (504), and N+2 (506). Each frame is shown with lines 0 to L. The time for the performance of statistics calculations 514, 516, or 518 is shown after each corresponding frame. A separate column is provided to show the operation for each of the frames and by the sensor 508 which is similar to sensor 102, EmDA 510 which is similar to EmDA 108, and automatic controls/AEC component 512 which is similar to component 110, 114, and/or 159.

The process 500 shows the sensor 508 forming the embedded data, and the EmDA 510 calculating the extra digital gain. The process 500 also includes the automatic controls/AEC component 512 sending or providing a new exposure convergence plan ae_conv_plan for frames N+1 to N+4 to the EmDA and during the idle period after the analysis of frame N and calculation of its statistics 514, but before the analysis of the next frame N+1. During the analysis of frame N+1, emda exposure convergence plan is updated, and then EmDA is run to calculate the extra digital gain for frame N+1 using the updated emda convergence plan. Going forward, EmDA is run for N+2 and the emda convergence plan from N+1 is updated for N+2. By one example, the process is repeated for each frame, and a new or updated emda exposure convergence plan is provided for each future frame.

Figure 6:
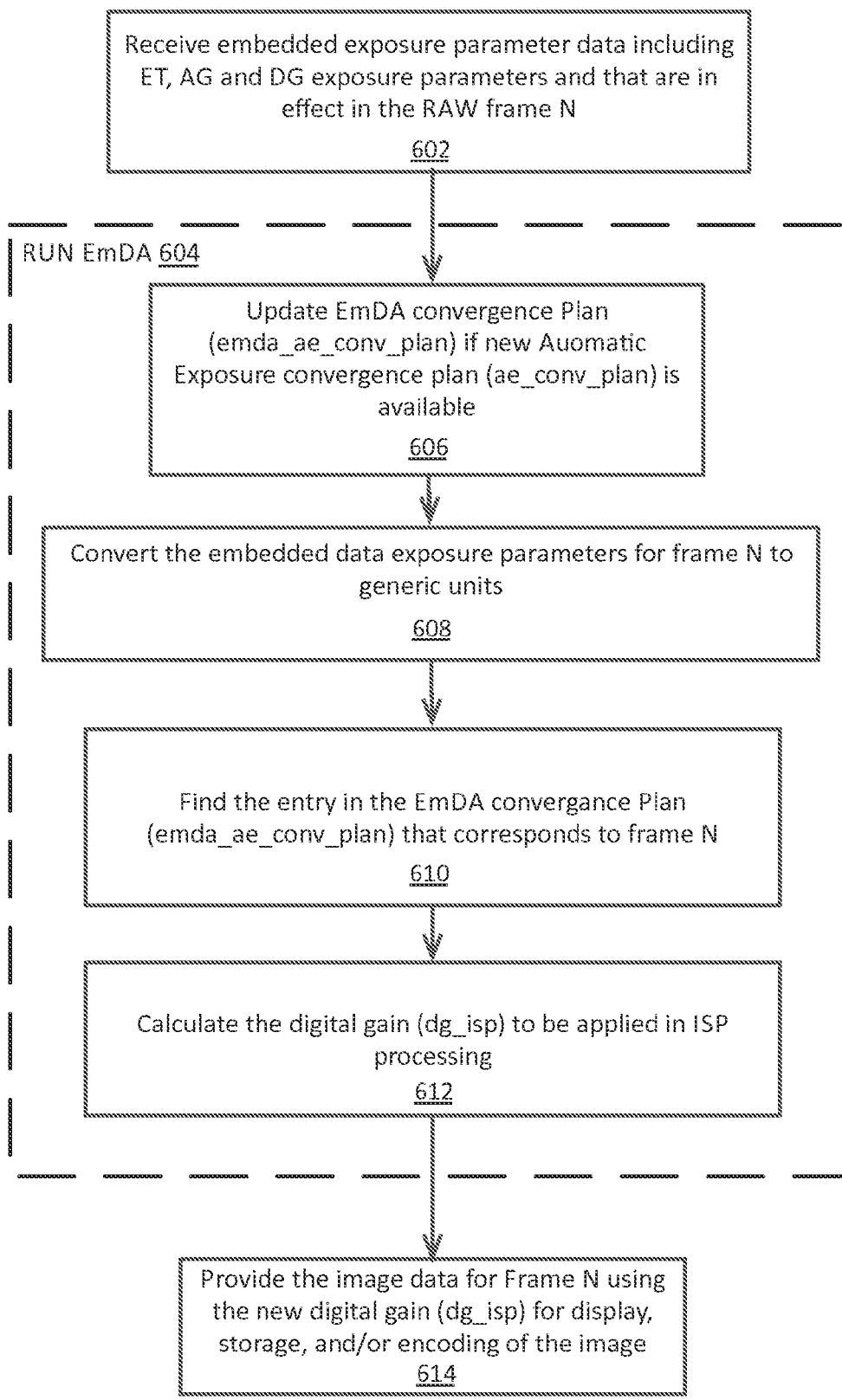
FIG. 6 is a flow chart illustrating an example automatic exposure control process.

Referring to FIG. 6, a process 600 is provided to show the operation of the EmDA in more detail. Process 600 described herein is arranged in accordance with at least some implementations of the present disclosure. In the illustrated implementation, process 600 may include one or more operations, functions, or actions as illustrated by one or more of operations 602 to 614 numbered evenly. By way of non-limiting example, process 600 will be described herein with reference to example image processing system of FIGS. 1A-1B and/or 8.

Process 600 may include "receive embedded exposure parameter data including ET, AG, and DG exposure parameters and that are in effect in the RAW frame N" 602. In other words, the exposure parameter data that was provided to the sensor 102 from the AEC component 114 was used to set the exposure time for a frame, and then embedded in the data stream with the captured image data. This operation may or may not also include calculating the actual total exposures where (ET)(DG)(AG)=actual total exposure.

Once the embedded data is received, process 600 may continue with "run EmDA" 604 to operate the following EmDA procedures, although many of the other components may perform these operations instead. This may first include "update EmDA convergence plan (emda_ae_conv_plan) if new automatic exposure convergence plan (ae_conv_plan) is available" 606. Thus, the EmDA checks to see if a new convergence plan is available, and then obtains the plan, or obtains the exposure data from the plan. This may include the target total exposures and the frame identification or number for each time. Alternatively, the EmDA may be provided with a target exposure time, digital gain, and analog gain, and then the EmDA may calculate the total exposure, where:

$$(et)(dg)(ag) = \text{target total exposure} \quad (1)$$

By one approach, the new exposure data placed into the emda convergence plan may override or replace data of any frame number slots already in the emda convergence plan, and new frame numbers may be appended to the end of the list in the emda convergence plan. The slots of old, already used frame numbers that are passed can be re-used by new frame number slots such that a circular buffer, such as buffer 838 (FIG. 8) can be used by the EmDA to store the convergence plan.

Process 600 may then continue with "convert the embedded data exposure parameters for frame N to generic units" 608. The pseudo code for the conversion is provided below. As mentioned above, this conversion may include converting sensor units to generic units, such as converting the exposure time (ET), which may be in terms of integration pixel and line periods into microseconds as well as converting the obtained actual analog and digital gain codes into multipliers. The format of the gain codes depends on the sensor implementation. Typical format is the SMIA 1.0 format:

$$\text{gain} = \frac{M0 * \text{code} + C0}{M1 * \text{code} + C1} \quad (2)$$

in which M0, C0, M1, C1 are the constant parameters that are associated with the sensor, "code" is the gain code, and "gain" is the real analog gain as a multiplier. The embedded data may have the analog gain code "code". Digital gain may be stored in embedded data for example as a 16 bit fixed point number with 8 fractional bits.

Process 600 may include "find the entry in the EmDA convergence plan (emda_ae_conv_plan) that corresponds to frame N" 610. Thus, the EmDA looks up the frame number or other frame identification for the frame N that has the actual exposure parameters currently being analyzed by the EmDA in order to find the matching target total exposure from the EmDA exposure convergence plan.

Once a match is found, the process 600 may proceed to "calculate the extra digital gain (dg_isp) to be applied in ISP processing" 612. As repeated here from the pseudo code below, the extra digital gain may be calculated by dividing the target total exposure by the actual total exposure for a frame:

$$dg\_isp = \text{emda\_conv\_plan}[\text{ind}]/(et * ag * dg) \quad (3)$$

emda_conv_plan[ind] refers to the target total exposure found in the emda convergence plan index, and et, ag, and dg refer to actual exposure time, analog gain, and digital gain respectively. By one approach, a minimum value for extra digital gain is set at at least 1.0, and in one option about 1.0 or exactly 1.0. In this case, if the ratio or fraction is more than one, than that value is used as the multiplier. If the multiplier is below 1.0, then 1.0 is used as the minimum and refers to no change in gain (extra digital gain is ×1.0). Dg_isp is then set as 1.0 in the equations in which it is used. In this case, the extra digital gain may be provided for every frame. The limitation is used because saturated areas in the image can become colored if less than 1.0 gains are allowed when applying the extra digital gains to white balance gains. For example, a very bright lamp that is saturated in the image, and should look white, may look purple instead. When the ISP has a component that uses the extra digital gain from the EmDA and that does not need this minimum extra digital gain limitation, then the limitation may be removed.

By the present examples, the extra digital gain is usually provided as a multiplier, and the ISP may then modify the multiplier as needed for its calculations such as for white balance or gamma adjustments. For other examples, the extra digital gain might be a corresponding actual total exposure subtracted from the target total exposure instead. It will be understood that there are many alternatives for calculating the extra digital gain.

Also, as other alternatives, instead of basing the extra digital gain on a ratio of total exposures, the digital gain could be based on the ratio of target to actual exposure times, or the total exposure used may factor in other parameters such as aperture gain and/or ND filter gain such that Etot=ET*AG*DG*ApertureGain*NDFilterGain, in which ApertureGain is the multiplicative impact from using a different aperture size than a reference aperture size, and NDFilterGain is the multiplicative impact from using ND filter in comparison to not using ND filter. In some systems, it may be possible to provide image brightness measurements (e.g. average brightness of image data for example) in the embedded data when known. Then the ratio could be calculated between actual brightness vs. target brightness.

Process 600 may then include "provide the image data for Frame N using the new digital gain (dg_isp) for display, storage, and/or encoding of the image" 614. As mentioned herein, the extra digital gain may be used in ISP processing by multiplying it by white balance gain values, for one example.

By another aspect, an intentional underexposure may be used to reduce overexposure. Specifically, and as mentioned above, the extra digital gain calculated by the EmDA may be limited to a minimum value, such as 1.0. With that limitation in place, and when converging down from over exposure, EmDA cannot match the target exposure and provide an exact ratio for extra digital gain when the target exposure is less than the actual exposure. This problem can be alleviated by intentionally under-exposing, and hence leaving headroom for EmDA digital gain. This provides a trade-off between brightness accuracy during the convergence and preview or video noise. In other words, the downside to using the intentional underexposure is that noise is increased because underexposure causes worse signal-to-noise ratio (SNR), and then noise is amplified by the digital gain by the same amount as the real signal.

To implement this aspect, the target total exposure that is sent to the camera sensor (via for example, ET, AG, DG values) may be intentionally set less than the optimal target total exposure that is set in the emda convergence plan in order to intentionally permit the image to be underexposed before the extra digital gain is calculated by the EmDA. This may be used when an overexposed frame is converged to a smaller brightness value. For one non-limiting example, the target total exposure that AEC estimates for a particular scene could be, for example, 60 ms (from ET=30 ms, AG=2.0, DG=1.0), and the target total exposure would be placed in the AE convergence plan. However, AEC might send the sensor ET=30 ms, AG=1.0, DG=1.0 (which corresponds to a total exposure of 30 ms). Then EmDA would propose ×2.0 extra digital gain (60 over 30). In this case, the impact to noise would be minimal since only on-sensor analog gain was impacted, not the exposure time that generates the actual image signal. To expand the example, then, if the camera is suddenly pointed to a brighter scene, the total exposure of 60 ms would result in an over-exposed image. But since there is ×2.0 extra digital gain in effect, the convergence plan could be changed immediately so that brightness starts reducing smoothly, without EmDA needing to use digital gain values below 1.0. That is, if there was delay in applying new exposure parameters on the sensor, EmDA could compensate by reducing the extra digital gain from ×2.0. If the exposure time is changed instead of one of the gains where ET=60 ms where AG=1.0 and DG=1.0, and this frame is underexposed intentionally to ET=30 ms where AG=1.0 & DG=1.0, then the operation would be the same, but noise would increase more since exposure time was halved. As a positive side effect, the risk of motion blur would be reduced, since exposure time was reduced.

Figure 7:
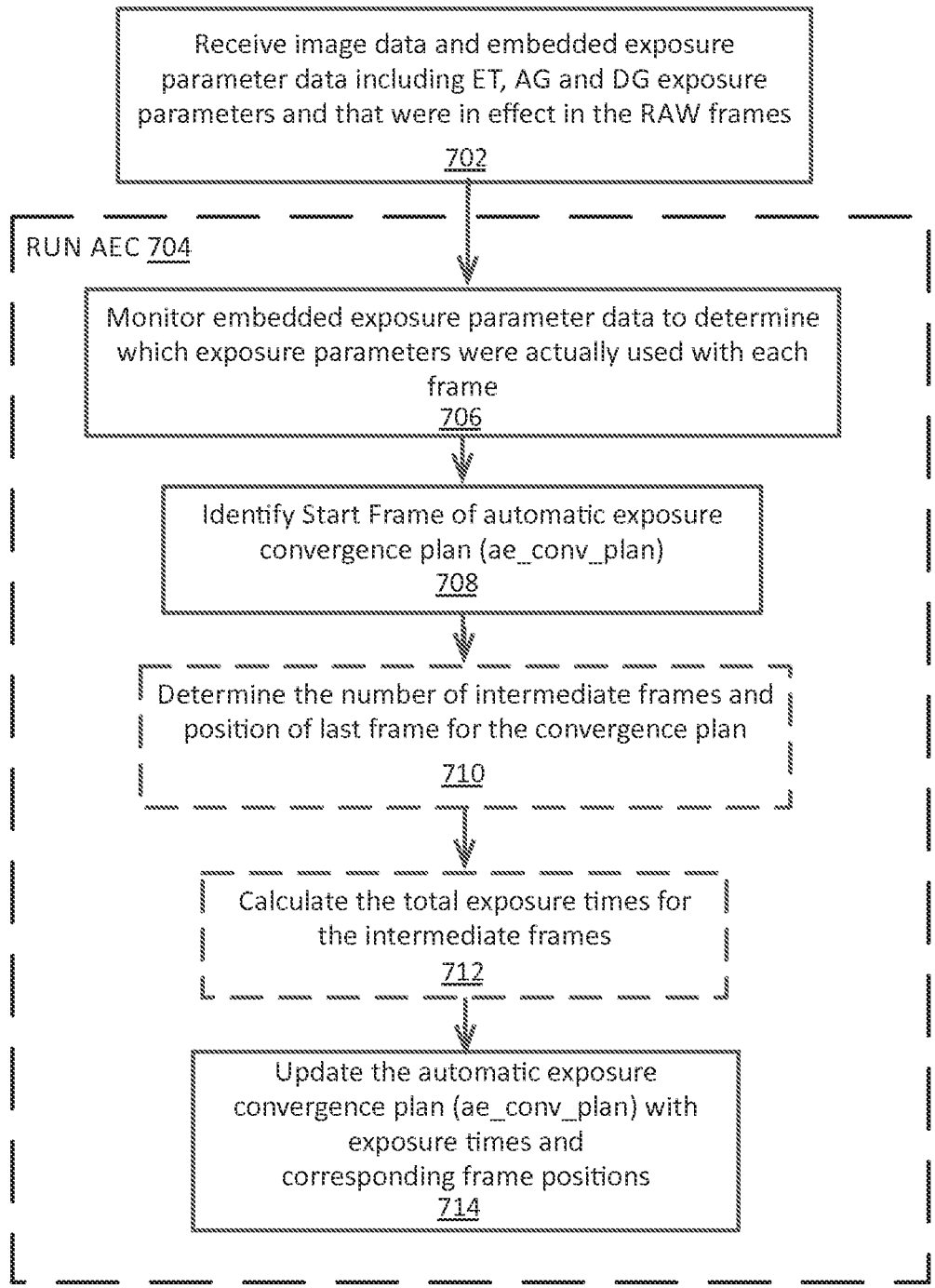
FIG. 7 is a flow chart illustrating an example process for providing a convergence plan.

Referring to FIG. 7, process 700 is provided to show formation of the automatic exposure convergence plan (ae_conv_plan). Process 700 described herein is arranged in accordance with at least some implementations of the present disclosure. In the illustrated implementation, process 700 may include one or more operations, functions, or actions as illustrated by one or more of operations 702 to 714 numbered evenly. By way of non-limiting example, process 700 will be described herein with reference to example image processing system of FIGS. 1A-1B and/or 8.

Process 700 may include "receive image and embedded exposure parameter data including ET, AG, and DG exposure parameters and that were in effect in the RAW frames" 702. Thereafter, the AEC component 114, 159, 818, or 837 may run 704, and "monitor embedded exposure parameter data to determine which exposure parameters were actually used with a frame" 706. While the AEC sends new exposure parameters via an I2C transfer to the sensor, the AEC cannot know beforehand the timing and exact frame that will use the new exposure parameters. Thus, the use of the exposure parameters can be determined by reading the received embedded data with the frame it was used as it is provided from the camera sensor.

The process 700 may continue with "identify start frame of automatic exposure convergence plan (ae_conv_plan)" 708. As mentioned earlier, the exposure plan should be updated well before EmDA reaches the last total exposure of convergence plan because otherwise if AEC analysis happens to be delayed when EmDA has already consumed the last total exposure, EmDA will not have any reference total exposure available when new frame arrives from a sensor. In one form, as mentioned above, a convergence plan is automatically provided for every frame while AEC is desired. Otherwise, a convergence plan update may not be needed every frame, but may be a few frames apart as long as it is not delayed such that lower quality images are detected. For a digital camera, the convergence, and in turn the updating of the convergence plans, that is performed during viewfinding may be continuous until the image is captured, and then the convergence and viewfinding is started again. Otherwise, the viewfinder exposure may not always react to changes in framing and changes in an image scene sufficiently fast and smooth.

Nevertheless, by other alternative example approaches, the AEC component 114, 159, or 818 for example may form a new convergence plan automatically whenever a change in scene is detected using the image data. Such scene change detection may be based on inter-prediction motion estimation techniques or change in average brightness of the scene, for example. By another alternative, the process 700 may include monitoring the total exposure or brightness difference from frame to frame (N+1 to N). Such a comparison or difference may be compared to a threshold. If it is above a threshold, then a new, more gradual or smoother convergence plan is needed. Otherwise, the embedded data may be monitored, and when an end of a convergence plan is expected (such as a convergence plan that starts at N and should end at N+3), and the final target brightness still is not reached, a new convergence plan may be generated to extend the plan being monitored until the target brightness is reached. This may be done by either a new interpolation calculation from the actual total exposure at N+3 out to the final target total exposure, or the convergence plan may simply continue the same changes in brightness (or in other words, interval or step in brightness is the same in the positive or negative direction) as actually in effect for N+1, N+2, N+3, and for how many number of frames needed to reach the final target total exposure.

Once it is decided that a new convergence plan is needed, the process 700 may then "determine the number of intermediate frames and position of last frame for the convergence plan" 710. In one form, this may be affected by a tuned setting of recording speed by design engineers to capture a fast moving object being recorded or special effects desired such as slow motion. In this case, the AEC may operate at different speeds such that when the recording speed is faster (more frames per second), the AEC reaction in terms of frames may be slower (for example, the AEC analyzes 1 frame every 6+ frames rather than every third frame when the recording speed is slower). This is provided because it can be desirable to have constant convergence time (number of frames for example) for a particular use case regardless of the frame rate. If the AEC is tuned to react very fast, the AEC may do a complete re-analysis, for example, every three frames. In this case, if frame N is analyzed, so is frame N+4, and intermediate frames N+1 and N+2 are interpolated to provide a smooth brightness transition with the final target brightness (or total exposure) occurring at N+3.

On the other hand, if the AEC is tuned to react more slowly, then more frames may be interpolated. So when the AEC does full analysis of statistics for frame N, the AEC may plan for example that this new exposure will become effective in frame N+5, and frames N+1 to N+4 will be interpolated to make smooth transition towards the new exposure time. By other alternatives, the number of interpolated frames to be used may be fixed, such as at two, three, or four, no matter the situation. Otherwise, the number of interpolated frames may be set by a maximum difference in total exposure between adjacent frames. Thus, if the change in brightness or total exposure cannot differ by more than x from frame to frame, and the convergence plan needs a total change in brightness of 5×, then a start frame, end frame, and three interpolated frames will be used. In other alternatives AEC may change the convergence plan every frame, and the plan becomes updated less frequently only if AEC analysis is delayed for some reason. The tuning parameters for stabilization of AEC including certain algorithm-specific parameters may also impact the convergence speed. Many other examples exist.

Once the number of frames for the convergence plan are set, and the frames are identified, the process 700 may continue with "calculate the total exposures for the intermediate frames" 712 so that interpolated total exposures are calculated and set for these intermediate frame number slots.

Process 700 may then include "update the automatic exposure convergence plan (ae_conv_plan) with exposure times and frame positions" 712. Thus, the intermediate or interpolated total exposures are set into the automatic exposure convergence plan frame slots, along with the start and final target total exposures. By another alternative, calculated exposure parameters, such as an exposure time, digital gain, and analog gain (the gains themselves may be actual or interpolated), may be set into the convergence plan instead, so that the EmDA can calculate the total exposures instead of being provided total exposures by the AE convergence plan. Thereafter, the AE exposure convergence plan (ae_conv_plan) is sent or made accessible to the EmDA.

Example Pseudo code for operating the system may be as follows.

In addition, any one or more of the operations of FIGS. 2-4 and 6-7 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does

```
Set Variables/parameters:
typedef struct
{
    uint32_t total_exposure; // microseconds
    uint32_t frame_number; // which frame the total_exposure corresponds to
} ae_conv_plan_cell;
typedef struct
{
    uint16_t et_pix_period;
    uint16_t et_line_period;
    uint16_t ag_gain_code;
    uint16_t dg_gain;
} ia_camera_sensor_embedded_data;
int init_emda(uint32_t* frame_number)
{
    *frame_number = 0;
}
Set plan emda convergence plan size:
ae_conv_plan_cell emda_ae_conv_plan[emda_ae_conv_plan_size]; // e.g.
emda_ae_conv_plan_size = 8
EmDA Operation as follows (annotated with underliningforemphasis):
// The main function_run emda(...). The function is called every frame in ISP or other suitable
processing unit, after receiving the embedded data
// from the sensor. ae_conv_plan is NULL if no new plan has been received.
int run_emda(ae_conv_plan_cell* ae_conv_plan, const int ae_conv_plan_size, const
ia_camera_sensor_embedded_data embedded_data, const uint32_t frame_number)
{
    // Update emda_ae_conv_plan according to ae_conv_plan, if ae_conv_plan != NULL
[code here]
// Convert embedded_data into generic exposure units et (unit is microseconds), ag (float) and dg
(float)
convert_sensor_units_to_exposure_time( )
{
    return
((coarse_integration_time*pixel_periods_per_line)+fine_integration_time)/pixel_clock_freq_mhz)
}
[code here]
// Find the index "ind"in emda_ae_conv_plan that corresponds to frame_number
[code here]
// Calculate needed digital gain in ISP side if the target total exposure is not achieved by the
exposure
// parameters that are currently in effect
double dg_isp = max(1.0, emda_ae_conv_plan[ind]/(et*ag*dg));
// Multiply the WB gains in the ISP with dg_isp (also could be other ISP block than WB gains,
but must not
// impact 3A statistics)
[code here]
}
where coarse is the exposure in terms of line periods, and fine is the additional exposure time in
terms of pixel periods.
``` include those elements other than a signal per se that may hold data temporarily in a "transitory" fashion such as RAM and so forth.

As used in any implementation described herein, the term "module" refers to any combination of software logic and/or firmware logic configured to provide the functionality described herein. The software may be embodied as a software package, code and/or instruction set, and/or firmware that stores instructions executed by programmable circuitry. The modules may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

As used in any implementation described herein, the term "engine" and/or "component" may refer to a module or to a logic unit, as these terms are described above. Accordingly, the term "engine" and/or "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 8:
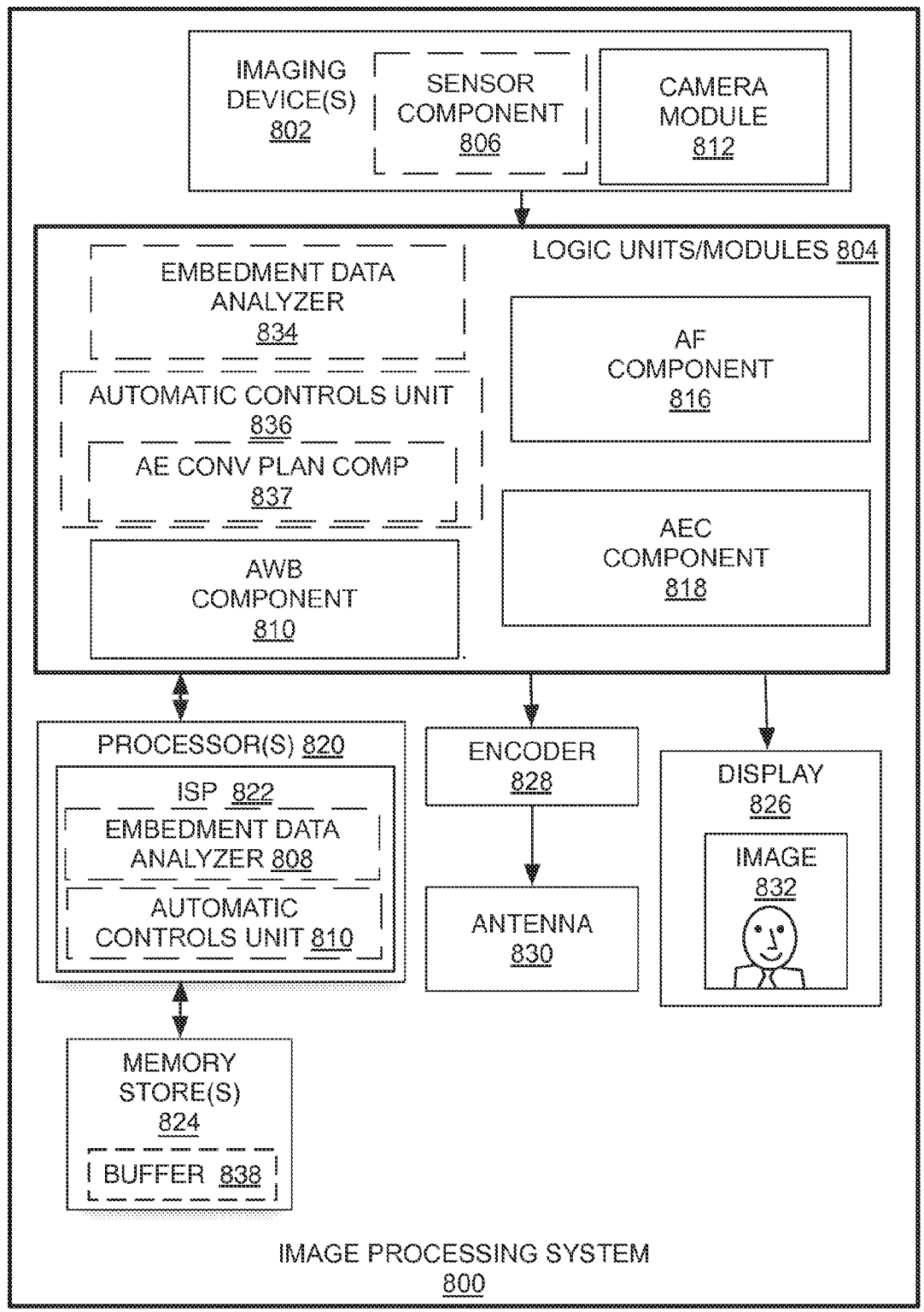
FIG. 8 is an illustrative diagram of an example image processing system

Referring to FIG. 8, an example image processing system 800 is arranged in accordance with at least some implementations of the present disclosure. In various implementations, the example image processing system 800 may have an imaging device 802 to form or receive captured image data. This can be implemented in various ways. Thus, in one form, the image processing system 800 may be a digital camera or other image capture device, and imaging device 802, in this case, may be the camera hardware and camera sensor software, module, or component 812. In other examples, imaging processing system 800 may have an imaging device 802 that includes or may be a camera, and logic modules 804 may communicate remotely with, or otherwise may be communicatively coupled to, the imaging device 802 for further processing of the image data.

In either case, such technology may include a camera such as a digital camera system, a dedicated camera device, or an imaging phone, whether a still picture or video camera or some combination of both. Thus, in one form, imaging device 802 may include camera hardware and optics including one or more sensors as well as auto-focus, zoom, aperture, ND-filter, auto-exposure, flash, and actuator controls. These controls may be part of a sensor module or component 806 for operating the sensor. The sensor component 812 may be part of the imaging device 802, or may be part of the logical modules 804 or both. Such sensor component can be used to generate images for a viewfinder and take still pictures or video. The imaging device 802 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types as long as EmDA is available before the image data. In other examples, an RGB-Depth camera and/or microphone-array might be used in addition to or in the alternative to a camera sensor. In some examples, imaging device 802 may be provided with an eye tracking camera.

In the illustrated example, the logic modules 804 may include the automatic white balancing control 814, automatic focus (AF) module 816, and automatic exposure control (AEC) module 818. An embedded data analyzer 808 or 834 may be provided as part of the logic modules and/or on board the processor 820 such as an ISP 822. The automatic controls unit 836 or 810 may be provided similarly. The logic modules may be communicatively coupled to the imaging device 802 in order to receive the raw image data and embedded data described herein.

The automatic controls unit 836 provides 3A statistics, and the AEC convergence plan component 837 for establishing and updating the AE convergence plan from the embedded data may be considered to be part of the automatic controls unit 836, Otherwise, the AEC component 114 may handle the creation of the AE convergence plan.

The image processing system 800 may have one or more processors 820 which may include the dedicated image signal processor (ISP) 822 such as the Intel Atom, memory stores 824, one or more displays 826, encoder 828, and antenna 830. In one example implementation, the image processing system 100 may have the display 826, at least one processor 820 communicatively coupled to the display, at least one memory 824 communicatively coupled to the processor and having a circular buffer 838 by one example for storing the EmDA convergence plan. The encoder 828 and antenna 830 may be provided to compress the modified image date for transmission to other devices that may display or store the image. It will be understood that the image processing system 800 may also include a decoder (or encoder 828 may include a decoder) to receive and decode image data for processing by the system 800. Otherwise, the processed image 832 may be displayed on display 826 or stored in memory 824. As illustrated, any of these components may be capable of communication with one another and/or communication with portions of logic modules 804 and/or imaging device 802. Thus, processors 820 may be communicatively coupled to both the image device 802 and the logic modules 804 for operating those components. By one approach, although image processing system 800, as shown in FIG. 8, may include one particular set of blocks or actions associated with particular components or modules, these blocks or actions may be associated with different components or modules than the particular component or module illustrated here.

Figure 9:
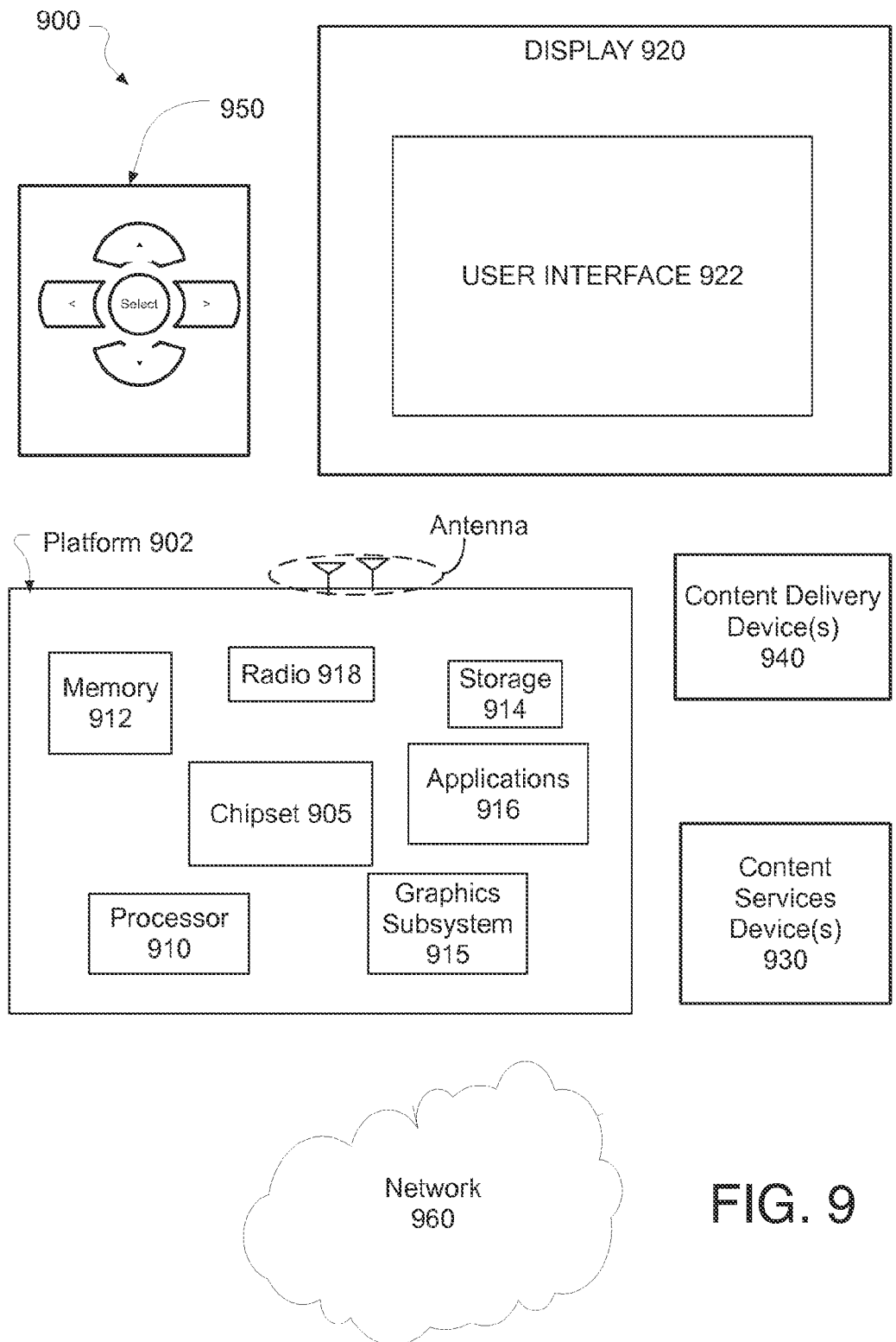
FIG. 9 is an illustrative diagram of an example system.

Referring to FIG. 9, an example system 900 in accordance with the present disclosure operates one or more aspects of the image processing system described herein. It will be understood from the nature of the system components described below that such components may be associated with, or used to operate, certain part or parts of the image processing system described above. In various implementations, system 900 may be a media system although system 900 is not limited to this context. For example, system 900 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, Display Port, wireless HDMI, and/or wireless HD compliant techniques. Graphics subsystem 915 may be integrated into processor 910 or chipset 905. In some implementations, graphics subsystem 915 may be a stand-alone card communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of controller 950 may be used to interact with user interface 922, for example. In embodiments, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In embodiments, controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 9.

Referring to FIG. 9, a small form factor device 1000 is one example of the varying physical styles or form factors in which system 900 may be embodied. By this approach, device 1000 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 10:
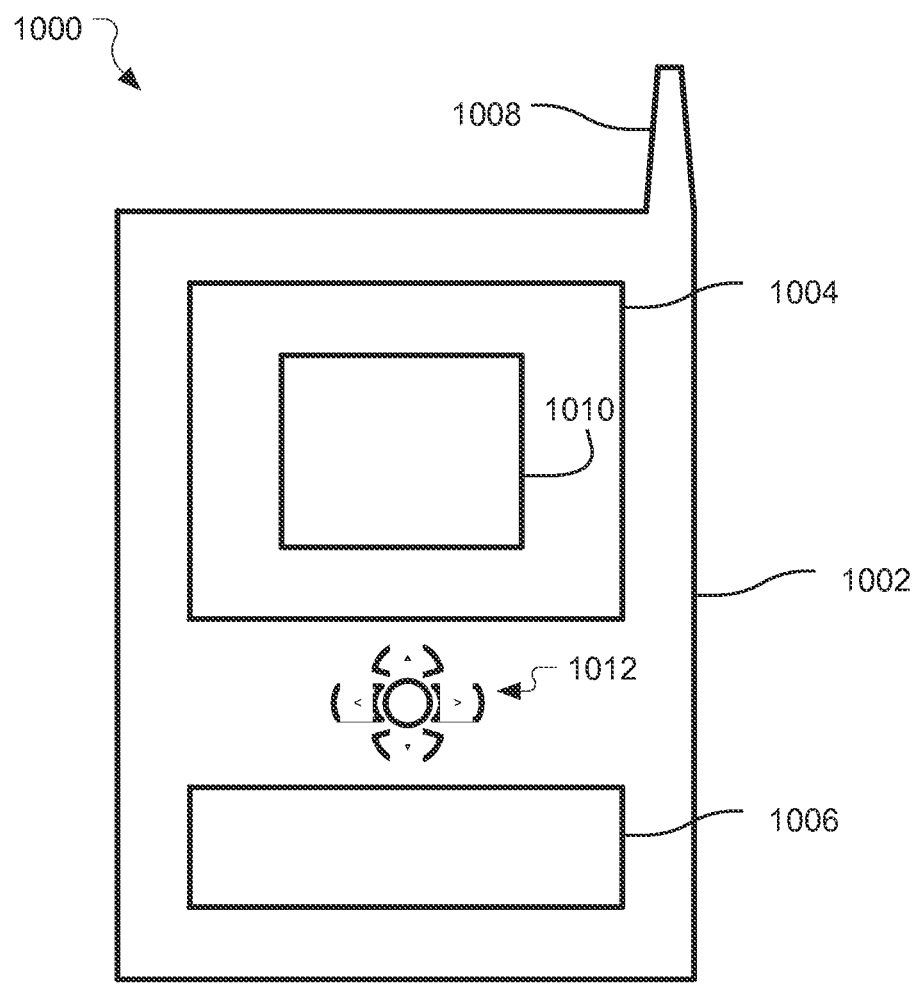
FIG. 10 is an illustrative diagram of an example system, all arranged in accordance with at least some implementations of the present disclosure.

As shown in FIG. 10, device 1000 may include a housing 1002, a display 1004 including a screen 1010, an input/output (I/O) device 1006, and an antenna 1008. Device 1000 also may include navigation features 1012. Display 1004 may include any suitable display unit for displaying information appropriate for a mobile computing device. I/O device 1006 may include any suitable I/O device for entering information into a mobile computing device. Examples for I/O device 1006 may include an alphanumeric keyboard, a numeric keypad, a touch pad, input keys, buttons, switches, rocker switches, microphones, speakers, voice recognition device and software, and so forth. Information also may be entered into device 1000 by way of microphone (not shown). Such information may be digitized by a voice recognition device (not shown). The embodiments are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of automatic exposure control, comprises receiving embedded exposure parameter data used to capture image data for a plurality of frames and embedded in a data stream with image data, and obtaining convergence plan data of a plurality of target exposure parameter values forming at least part of an exposure convergence plan, where the convergence plan data provides data to form a targeted variation of brightness along a sequence of frames. This method also may include determining an extra digital gain calculated by using both the embedded exposure parameter data for a frame of the sequence of frames, and a corresponding target exposure parameter of the exposure convergence plan, and providing the extra digital gain for image processing to display, store, and/or encode the frame of the sequence of frames.

By another implementation, the method comprises providing the extra digital gain for image processing at a timing that is different than a delayed timing used to provide exposure parameters to a camera sensor capturing a sequence of frames. The embedded exposure parameter data is used to calculate an actual total exposure for the frame, and the target exposure parameter is a target total exposure. By one form, the exposure convergence plan is a second exposure convergence plan, the method comprising generating a first exposure convergence plan to provide a smooth change in brightness along a sequence of frames where the first exposure convergence plan comprises target exposure parameters or target total exposures or both. The method also comprises updating the second exposure convergence plan with new target exposure parameters or new target total exposures from the first exposure convergence plan, and using the second convergence plan to calculate the extra digital gain. The first exposure convergence plan comprises exposure data developed by calculating total exposures for two frames spaced from each other along the sequence, and interpolating the total exposures for frames between the two frames.

For this method, the embedded exposure parameter data comprises at least one of: exposure time, actual digital gain, analog gain, and all three parameters above, where the at least one embedded exposure parameter is placed in a start of field or end of field section of the data stream and received from a camera sensor, and where the extra digital gain is a multiple derived by dividing a target total exposure from the convergence plan by a total exposure derived from the embedded data. The extra digital gain is provided for each frame, and the extra digital gain equals a minimum limit value when the target total exposure is less than a corresponding total exposure derived from the embedded data, and where in one example the minimum limit value equals 1.0. The method also comprises providing exposure data to intentionally cause the embedded data to provide a total exposure that results in, or would result in, an underexposure for a frame.

By yet another implementation, a system for image processing with automatic exposure control, comprises a display, at least one processor communicatively coupled to the display, at least one memory communicatively coupled to at least one processor, and an embedded exposure data analyzer communicatively coupled to the processor. The embedded exposure data analyzer may be configured to: receive embedded exposure parameter data used to capture image data for a plurality of frames and embedded in a data stream with image data, obtain convergence plan data of a plurality of target exposure parameter values forming at least part of an exposure convergence plan, wherein the convergence plan data provides data to form a targeted variation of brightness along a sequence of frames, determine an extra digital gain calculated by using both the embedded exposure parameter data for a frame of the sequence of frames, and a corresponding target exposure parameter of the exposure convergence plan, and provide the extra digital gain for image processing to display, store, and/or encode the frame of the sequence of frames.

By another example, the embedded exposure data analyzer is configured to provide the extra digital gain for image processing at a timing that is different than a delayed timing used to provide exposure parameters to a camera sensor capturing a sequence of frames. The embedded exposure parameter data is used to calculate an actual total exposure for the frame, and the target exposure parameter is a target total exposure. The exposure convergence plan is a second exposure convergence plan, the system comprises a first exposure convergence plan to provide a smooth change in brightness along a sequence of frames where the first exposure convergence plan comprises exposure parameters or total exposures or both, and where the second exposure convergence plan is updated with new exposure parameters or new total exposures from the first exposure convergence plan and is used to calculate the extra digital gain. The first exposure convergence plan comprises exposure data developed by calculating total exposures for two frames spaced from each other along the sequence, and interpolating the total exposures for frames between the two frames.

By a further example, the embedded exposure parameter data comprises at least one of: exposure time, actual digital gain, analog gain, and all three parameters above, where the at least one embedded exposure parameter is placed in a start of field or end of field section of the data stream and received from a camera sensor. Also, the extra digital gain is a multiple derived by dividing a target total exposure by a total exposure derived from the embedded data where both total exposures correspond to the same frame, where the extra digital gain is provided for each frame, and where the extra digital gain equals a minimum limit value when the target total exposure is less than a corresponding total exposure derived from the embedded data, and where in one example the minimum limit value equals 1.0. Also, the embedded data comprises exposure data to intentionally provide a total exposure that results in, or would result in, an underexposure for a frame.

By one approach, an article having a readable medium comprises a plurality of instructions that in response to being executed on a computing device, causes the computing device to receive embedded exposure parameter data used to capture image data for a plurality of frames and embedded in a data stream with image data, and obtain convergence plan data of a plurality of target exposure parameter values forming at least part of an exposure convergence plan, where the convergence plan data provides data to form a targeted variation of brightness along a sequence of frames. This also may include determine an extra digital gain calculated by using both the embedded exposure parameter data for a frame of the sequence of frames, and a corresponding target exposure parameter of the exposure convergence plan, and provide the extra digital gain for image processing to display, store, and/or encode the frame of the sequence of frames.

By another approach, the instructions cause the computing device to provide the extra digital gain for image processing at a timing that is different than a delayed timing used to provide exposure parameters to a camera sensor capturing a sequence of frames. The embedded exposure parameter data is used to calculate an actual total exposure for the frame, and the target exposure parameter is a target total exposure. By one form, the exposure convergence plan is a second exposure convergence plan, the computing device to generate a first exposure convergence plan to provide a smooth change in brightness along a sequence of frames where the first exposure convergence plan comprises target exposure parameters or target total exposures or both. The computing device also to update the second exposure convergence plan with new target exposure parameters or new target total exposures from the first exposure convergence plan, and use the second convergence plan to calculate the extra digital gain. The first exposure convergence plan comprises exposure data developed by calculating total exposures for two frames spaced from each other along the sequence, and interpolating the total exposures for frames between the two frames.

For this article, the embedded exposure parameter data comprises at least one of: exposure time, actual digital gain, analog gain, and all three parameters above, where the at least one embedded exposure parameter is placed in a start of field or end of field section of the data stream and received from a camera sensor, and where the extra digital gain is a multiple derived by dividing a target total exposure from the convergence plan by a total exposure derived from the embedded data. The extra digital gain is provided for each frame, and the extra digital gain equals a minimum limit value when the target total exposure is less than a corresponding total exposure derived from the embedded data, and where in one example the minimum limit value equals 1.0. The computing device also to provide exposure data to intentionally cause the embedded data to provide a total exposure that results in, or would result in, an underexposure for a frame.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of automatic exposure control, comprising:
   receiving embedded exposure parameter data used to capture image data for a plurality of frames and embedded in a data stream with image data;
   obtaining convergence plan data of a plurality of target exposure parameter values forming at least part of an exposure convergence plan, wherein the convergence plan data provides data to form a targeted gradual variation of brightness along a sequence of frames with changes in brightness from a start frame to an end frame with a target brightness, and comprising at least one intermediate frame, wherein the brightness changes from frame to frame;
   determining an extra digital gain calculated by using both the embedded exposure parameter data for a frame of the sequence of frames, and a corresponding target exposure parameter of the exposure convergence plan; and
   providing the extra digital gain for image processing to display, store, and/or encode the frame of the sequence of frames;
   wherein the exposure convergence plan is a second exposure convergence plan, the method comprising:
      generating a first exposure convergence plan to provide a smooth change in brightness along a sequence of frames wherein the first exposure convergence plan comprises target exposure parameters or target total exposures or both;
      updating the second exposure convergence plan with new target exposure parameters or new target total exposures from the first exposure convergence plan; and
      using the second convergence plan to calculate the extra digital gain;
   wherein the first exposure convergence plan comprises exposure data developed by calculating total exposures for two frames spaced from each other along the sequence, and interpolating the total exposures for frames between the two frames.

2. The method of claim 1 comprising:
   providing the extra digital gain for image processing at a timing that is different than a delayed timing used to provide exposure parameters to a camera sensor capturing a sequence of frames.

3. The method of claim 1 wherein the embedded exposure parameter data is used to calculate an actual total exposure for the frame, and the target exposure parameter is a target total exposure.

4. The method of claim 1 wherein the embedded exposure parameter data comprises at least one of:
   exposure time,
   actual digital gain,
   analog gain, and
   all three parameters above.

5. The method of claim 1 wherein the at least one embedded exposure parameter is placed in a start of field or end of field section of the data stream and received from a camera sensor.

6. The method of claim 1 wherein the extra digital gain is a multiple derived by dividing a target total exposure from the convergence plan by a total exposure derived from the embedded data.

7. The method of claim 1 wherein the extra digital gain is provided for each frame, and wherein the extra digital gain equals a minimum limit value when the target total exposure is less than a corresponding total exposure derived from the embedded data.

8. The method of claim 1 comprising providing exposure data to intentionally cause the embedded data to provide a total exposure that results in, or would result in, an underexposure for a frame.

9. The method of claim 1 comprising:
   providing the extra digital gain for image processing at a timing that is different than a delayed timing used to provide exposure parameters to a camera sensor capturing a sequence of frames;
   wherein the embedded exposure parameter data is used to calculate an actual total exposure for the frame, and the target exposure parameter is a target total exposure;
   wherein the embedded exposure parameter data comprises at least one of:
      exposure time,
      actual digital gain,
      analog gain, and
      all three parameters above;
   wherein the at least one embedded exposure parameter is placed in a start of field or end of field section of the data stream and received from a camera sensor;
   wherein the extra digital gain is a multiple derived by dividing a target total exposure from the convergence plan by a total exposure derived from the embedded data;
   wherein the extra digital gain is provided for each frame, and wherein the extra digital gain equals a minimum limit value when the target total exposure is less than a corresponding total exposure derived from the embedded data, and wherein the minimum limit value equals 1.0; and
   the method comprising providing exposure data to intentionally cause the embedded data to provide a total exposure that results in, or would result in, an underexposure for a frame.

10. The method of claim 1 comprising replacing an abrupt change in brightness between two consecutive frames as indicated by actually used exposure parameters and replaced with the sequence of the conversion plan data.

11. A system for image processing with automatic exposure control, comprising:
   a display;
   at least one processor communicatively coupled to the display;
   at least one memory communicatively coupled to at least one processor; and
   an embedded exposure data analyzer communicatively coupled to the processor, and being configured to:
   receive embedded exposure parameter data used to capture image data for a plurality of frames and embedded in a data stream with image data;
   obtain convergence plan data of a plurality of target exposure parameter values forming at least part of an exposure convergence plan, wherein the convergence plan data provides data to form a targeted variation of brightness along a sequence of frames with changes in brightness from a start frame to an end frame with a target brightness, and comprising at least one intermediate frame, wherein the brightness changes from frame to frame;
   determine an extra digital gain calculated by using both the embedded exposure parameter data for a frame of the sequence of frames, and a corresponding target exposure parameter of the exposure convergence plan, and
   provide the extra digital gain for image processing to display, store, and/or encode the frame of the sequence of frames;
   wherein the exposure convergence plan is a second exposure convergence plan, the system comprising:
   a first exposure convergence plan to provide a smooth change in brightness along a sequence of frames wherein the first exposure convergence plan comprises exposure parameters or total exposures or both, and
   wherein the second exposure convergence plan is updated with new exposure parameters or new total exposures from the first exposure convergence plan and is used to calculate the extra digital gain; and
   wherein the first exposure convergence plan comprises exposure data developed by calculating total exposures for two frames spaced from each other along the sequence, and interpolating the total exposures for frames between the two frames.

12. The system of claim 11 wherein the embedded exposure data analyzer is configured to provide the extra digital gain for image processing at a timing that is different than a delayed timing used to provide exposure parameters to a camera sensor capturing a sequence of frames; and
   wherein the embedded exposure parameter data is used to calculate an actual total exposure for the frame, and the target exposure parameter is a target total exposure.

13. The system of claim 11 wherein the embedded exposure parameter data comprises at least one of:
   exposure time,
   actual digital gain,
   analog gain, and
   all three parameters above; and
   wherein the at least one embedded exposure parameter is placed in a start of field or end of field section of the data stream and received from a camera sensor.

14. The system of claim 11 wherein the extra digital gain is a multiple derived by dividing a target total exposure by a total exposure derived from the embedded data wherein both total exposures correspond to the same frame.

15. The system of claim 11 wherein the embedded data comprises exposure data to intentionally provide a total exposure that results in, or would result in, an underexposure for a frame.

16. The system of claim 11 wherein the embedded exposure data analyzer is configured to provide the extra digital gain for image processing at a timing that is different than a delayed timing used to provide exposure parameters to a camera sensor capturing a sequence of frames;
wherein the embedded exposure parameter data is used to calculate an actual total exposure for the frame, and the target exposure parameter is a target total exposure;
wherein the embedded exposure parameter data comprises at least one of:
exposure time,
actual digital gain,
analog gain, and
all three parameters above;
wherein the at least one embedded exposure parameter is placed in a start of field or end of field section of the data stream and received from a camera sensor;
wherein the extra digital gain is a multiple derived by dividing a target total exposure by a total exposure derived from the embedded data wherein both total exposures correspond to the same frame;
wherein the extra digital gain is provided for each frame, and wherein the extra digital gain equals a minimum limit value when the target total exposure is less than a corresponding total exposure derived from the embedded data, and wherein the minimum limit value equals 1.0; and
wherein the embedded data comprises exposure data to intentionally provide a total exposure that results in, or would result in, an underexposure for a frame.

17. An article having a non-transitory computer-readable medium comprising a plurality of instructions that in response to being executed on a computing device, causes the computing device to:
receive embedded exposure parameter data used to capture image data for a plurality of frames and embedded in a data stream with image data;
obtain convergence plan data of a plurality of target total exposures forming at least part of an exposure convergence plan, wherein the convergence plan data provides data to form a targeted gradual variation of brightness along a sequence of frames with changes in brightness from a start frame to an end frame with a target brightness, and comprising at least one intermediate frame, wherein the brightness changes from frame to frame;
determine an extra digital gain calculated by using both an actual total exposure for a frame of the sequence of frames, calculated by using the embedded exposure parameter data, and a corresponding target total exposure associated with the exposure convergence plan; and
provide the extra digital gain for image processing to display, store, and/or encode the frame of the sequence of frames;
wherein the exposure convergence plan is a second exposure convergence plan, the computing device to:
generate a first exposure convergence plan to provide a smooth change in brightness along a sequence of frames wherein the first exposure convergence plan comprises target exposure parameters or target total exposures or both;
update the second exposure convergence plan with new target exposure parameters or new target total exposures from the first exposure convergence plan; and
use the second convergence plan to calculate the extra digital gain;
wherein the first exposure convergence plan comprises exposure data developed by calculating total exposures for two frames spaced from each other along the sequence, and interpolating the total exposures for frames between the two frames.

18. The article according to claim 17, wherein the instructions cause the computing device to:
provide the extra digital gain for image processing at a timing that is different than a delayed timing used to provide exposure parameters to a camera sensor capturing a sequence of frames;
wherein the embedded exposure parameter data is used to calculate an actual total exposure for the frame, and the target exposure parameter is a target total exposure;
wherein the embedded exposure parameter data comprises at least one of:
exposure time,
actual digital gain,
analog gain, and
all three parameters above;
wherein the at least one embedded exposure parameter is placed in a start of field or end of field section of the data stream and received from a camera sensor;
wherein the extra digital gain is a multiple derived by dividing a target total exposure from the convergence plan by a total exposure derived from the embedded data;
wherein the extra digital gain is provided for each frame, and wherein the extra digital gain equals a minimum limit value when the target total exposure is less than a corresponding total exposure derived from the embedded data, and wherein the minimum limit value equals 1.0; and
wherein the computing device to provide exposure data to intentionally cause the embedded data to provide a total exposure that results in, or would result in, an underexposure for a frame.

* * * * *